US011891851B2

(12) United States Patent
Dixon et al.

(10) Patent No.: US 11,891,851 B2
(45) Date of Patent: Feb. 6, 2024

(54) DOOR-READY MOLDING

(71) Applicant: Larson Manufacturing Company of South Dakota, LLC, Brookings, SD (US)

(72) Inventors: Alan M. Dixon, Brookings, SD (US); Michael W. Kondratuk, Brookings, SD (US); Jammey A. Rawden, Volga, SD (US)

(73) Assignee: LARSON MANUFACTURING COMPANY OF SOUTH DAKOTA, LLC, Brookings, SD (US)

( * ) Notice: Subject to any disclaimer, the term of this patent is extended or adjusted under 35 U.S.C. 154(b) by 49 days.

(21) Appl. No.: 17/318,538

(22) Filed: May 12, 2021

(65) Prior Publication Data

US 2021/0355743 A1 Nov. 18, 2021

Related U.S. Application Data

(60) Provisional application No. 63/025,328, filed on May 15, 2020.

(51) Int. Cl.

*E06B 1/04* (2006.01)
*E06B 1/52* (2006.01)
*E06B 3/06* (2006.01)

(52) U.S. Cl.

CPC .................. *E06B 1/52* (2013.01); *E06B 3/06* (2013.01); *E05Y 2900/132* (2013.01)

(58) Field of Classification Search

CPC .................................. E06B 1/60; E05B 5/003
USPC ........................................................ 52/204.1
See application file for complete search history.

(56) References Cited

U.S. PATENT DOCUMENTS 2,725,960 A * 12/1955 Milone .................. E06B 5/003 70/451
3,024,501 A * 3/1962 McPhail ................ E06B 5/003 49/505
3,164,228 A * 1/1965 Segre ...................... E06B 5/003 49/397
3,177,924 A * 4/1965 McPhail ................ E06B 7/231 49/63
3,274,733 A * 9/1966 Bailey ....................... E05F 5/06 16/81
4,297,812 A * 11/1981 McPhail ................ E06B 5/003 49/386
4,302,907 A 12/1981 Canals et al.
4,365,386 A * 12/1982 Lowery ................ E05D 5/0238 16/382
4,389,817 A * 6/1983 Olberding ............ E05B 47/026 49/67
4,531,337 A 7/1985 Holdiman (Continued)

*Primary Examiner* — Brian E Glessner
*Assistant Examiner* — James J Buckle, Jr.
(74) *Attorney, Agent, or Firm* — Calfee, Halter & Griswold LLP

(57) ABSTRACT

A door system including a primary door molding attachable to a primary door frame, the primary door molding including a first vertical member and a first hinge member extending from the first vertical member. One of a horizontal member from which the first vertical member downwardly extends and the first vertical member includes a first rotatably engageable element, and the first hinge member includes a second rotatably engageable element vertically spaced from the first rotatably engageable element.

20 Claims, 17 Drawing Sheets

(56) References Cited

U.S. PATENT DOCUMENTS

| | | | | | |
|---|---|---|---|---|---|
| 5,012,616 | A * | 5/1991 | Martin | E06B 5/003 | 49/501 |
| 5,483,771 | A * | 1/1996 | Herbst | E05D 5/04 | 49/504 |
| 6,185,881 | B1 | 2/2001 | Olberding et al. | | |
| 6,651,390 | B2 | 11/2003 | Camperelli | | |
| 6,941,997 | B2 | 9/2005 | Butler | | |
| 7,866,118 | B1 * | 1/2011 | Hamblin | E06B 5/003 | 160/369 |
| 8,850,744 | B2 | 10/2014 | Bauman et al. | | |
| 8,887,457 | B1 | 11/2014 | Knight | | |
| 9,316,041 | B2 | 4/2016 | Olson et al. | | |
| 10,774,570 | B1 | 9/2020 | Dixon et al. | | |
| 10,801,241 | B1 | 10/2020 | Dixon et al. | | |
| 10,801,242 | B1 | 10/2020 | Dixon et al. | | |
| 10,808,438 | B2 * | 10/2020 | Takase | E05B 47/0038 | |
| 10,995,534 | B1 | 5/2021 | Dixon et al. | | |
| 11,008,795 | B1 * | 5/2021 | Dixon | E05F 1/1091 | |
| 11,035,169 | B1 * | 6/2021 | Wermers | E06B 3/70 | |
| 11,655,665 | B2 | 5/2023 | Chavez | | |
| 2002/0174612 | A1 | 11/2002 | Camperelli | | |
| 2004/0173324 | A1 * | 9/2004 | Butler | E05D 3/04 | 160/92 |
| 2006/0150524 | A1 * | 7/2006 | Kibbel | E05B 63/14 | 49/501 |
| 2013/0333847 | A1 * | 12/2013 | Casseri | E06B 9/54 | 160/90 |
| 2014/0026489 | A1 | 1/2014 | Bauman et al. | | |
| 2014/0338275 | A1 | 11/2014 | Knight | | |
| 2015/0082702 | A1 | 3/2015 | Walter | | |
| 2016/0053527 | A1 | 2/2016 | Olson et al. | | |
| 2020/0131842 | A1 * | 4/2020 | Thomas | E06B 9/52 | |
| 2022/0003035 | A1 * | 1/2022 | Dixon | E05D 11/0009 | |

* cited by examiner

DOOR-READY MOLDING

CROSS-REFERENCE TO RELATED APPLICATIONS

This application claims the benefit of U.S. Provisional patent application No. 63/025,328, filed May 15, 2020, and titled "DOOR-READY MOLDING" the entire contents of which are incorporated herein by reference in its entirety.

TECHNICAL FIELD

The present disclosure generally relates to secondary doors such as storm doors and primary door systems with molding elements configured for rotatably mounting secondary doors without separate installation of a secondary door frame.

BACKGROUND

Door systems for entrances into residential and commercial buildings are well known in the art. Primary doors provide the main security and protection from exterior elements, while secondary doors such as screen doors, storm doors, and security doors offer additional functionality such as enhanced ventilation, energy efficiency, and security when paired with an existing primary door.

Known secondary door systems comprise a secondary door and a secondary door frame. Such systems are typically installed by attachment of the secondary door frame to the primary door frame or the brick molding surrounding the primary door frame by attachment means such as wood screws. The secondary door is connected to the secondary door frame by hinges on one side and optionally includes a latch on the other side to engage with the secondary door frame when closed.

Despite their widespread use, existing door systems have limitations. Existing secondary door systems often require specialized knowledge or skills to install properly and in correct alignment, which may result in the installation being done poorly or not at all. If the primary door and secondary door are produced by different manufacturers, differences in product designs and color selections may reduce aesthetic appeal. In addition, current commercially available doors may lack the functionality or selection that appeals to a wide variety of consumers and decision-makers.

The present disclosure seeks to address these issues, and may be utilized for residential and commercial door systems.

SUMMARY

In accordance with embodiments provided herein, a door system is described that includes a primary door molding attachable to a primary door frame, the primary door molding comprising a first vertical member and a first hinge member extending from the first vertical member. One of a horizontal member from which the first vertical member downwardly extends and the first vertical member comprises a first rotatably engageable element, and the first hinge member comprises a second rotatably engageable element vertically spaced from the first rotatably engageable element. The first rotatably engageable element may be vertically aligned with the second rotatably engageable element. The horizontal member may comprise the first rotatably engageable element, and/or the first hinge member may extend from a distal end of the first vertical member that is spaced from the horizontal member. The door system may further include a second hinge member extending from the first vertical member and vertically spaced from the first hinge member, wherein the second hinge member comprises the first rotatably engageable element.

The door system may further include a secondary door panel rotatably engageable with the first and second rotatably engageable elements. The secondary door panel may include at least one of a third rotatably engageable element engageable with the first rotatably engageable element and a fourth rotatably engageable element engageable with the second rotatably engageable element. Further, one of the first and third rotatably engageable elements may comprise a first pin-receiving portion while the other of the first and third rotatably engageable elements may comprise a first pin rotatably engageable with the first pin-receiving portion, and one of the second and fourth rotatably engageable elements may comprise a second pin-receiving portion while the other of the second and fourth rotatably engageable elements may comprise a second pin rotatably engageable with the second pin-receiving portion.

At least one of the first pin and the second pin may be retractable and extendable. Further, at least one of the first pin and the second pin may have a tapered end portion. At least one of the first and second rotatably engageable elements my comprise an aperture. At least one of the first and second rotatably engageable elements may comprise a bushing. Further, the bushing of at least one of the first and second rotatably engageable elements may comprise a tapered pin-receiving portion.

The primary door molding may further include a second vertical member extending downwardly from the horizontal member and spaced from the first vertical member. The second vertical member may include a door latch channel configured to receive a door latch bolt.

At least one of the first vertical member and the second vertical member may further include a mounting adapter channel, wherein the door system further comprises at least one mounting adapter that includes an attachment segment attachable to a vertical portion of a primary door frame, an intermediate segment extending at an angle from the first attachment segment, and a holding segment extending from the intermediate segment and positionable in the one of the mounting adapter channels. Both of the first and second vertical members may include a mounting adapter channel, and the door system may further include mounting adapters with holding segments positionable in the mounting adapter channels of the first and second vertical members. The primary door molding may be connectable to the primary door frame by the at least one mounting adapter such that the position of the primary door molding relative to the primary door frame is adjustable.

In an embodiment, a door system is provided that includes a primary door frame comprising a first horizontal frame member comprising a first end and an opposite second end, a first vertical frame member downwardly extending from the first end of the first horizontal frame member, a second vertical frame member downwardly extending from the second end of the first horizontal frame member, and a sill member spaced vertically from the first horizontal frame member and extending between the first and second vertical frame members. The system includes a primary door molding attachable to the primary door frame, the primary door molding comprising a first vertical member attached or attachable to one of the first and second vertical frame members. One of a horizontal member from which the first vertical member downwardly extends and the first vertical member comprises a first rotatably engageable element, and one of a first hinge member extending from the first vertical molding member and the sill member comprises a second rotatably engageable element vertically spaced from the first rotatably engageable element.

The door system further may include a secondary door panel rotatably engageable with the first and second rotatably engageable elements. The secondary door panel may include at least one of a third rotatably engageable element engageable with the first rotatably engageable element and a fourth rotatably engageable element engageable with the second rotatably engageable element. Further, one of the first and third rotatably engageable elements may comprise a first pin-receiving portion and the other of the first and third rotatably engageable elements may comprise a first pin rotatably engageable with the first pin-receiving portion, and one of the second and fourth rotatably engageable elements may comprise a second pin-receiving portion and the other of the second and fourth rotatably engageable elements may comprise a second pin rotatably engageable with the second pin-receiving portion.

In an embodiment, a method is provided for installing a door system in a building opening, wherein the door system comprises a primary door molding attachable to a primary door frame. The primary door molding includes a first vertical member and a first hinge member extending from the first vertical member. One of a horizontal member from which the first vertical member downwardly extends and the first vertical member comprises a first rotatably engageable element, and the first hinge member comprises a second rotatably engageable element vertically spaced from the first rotatably engageable element. The method includes the steps of mounting the primary door frame to the building opening and attaching the primary door molding to the primary door frame prior to or after the step of mounting the primary door frame to the building opening. The door system further may further include a secondary door panel comprising at least one of a third rotatably engageable element engageable with the first rotatably engageable element and a fourth rotatably engageable element engageable with the second rotatably engageable element, wherein the method further comprises a step of rotatably mounting the secondary door panel to the primary door molding by at least one of engaging the third rotatably engageable element with the first rotatably engageable element and engaging the fourth rotatably engageable element with the second rotatably engageable element.

In exemplary embodiments, door systems are described that include a primary door frame comprising a hinge-side jamb, a latch-side jamb, a head, and a sill; and a primary door molding comprising a hinge-side molding, a latch-side molding, and a top molding attached to the primary door frame, wherein the primary door molding is configured for rotatably mounting a secondary door. The door system may additionally comprise a primary door rotatably mounted to the primary door frame.

In exemplary embodiments, the primary door molding includes hinge pin receivers in one or both of the hinge-side molding and the top molding. For example, the primary door molding may comprise a hinge pin receiver on the underside of the top molding at a position near the hinge-side molding, and/or the hinge-side molding may comprise a hinge plate with a hinge pin receiver at a position near or at the bottom of the hinge side molding. Hinge pin receivers may be oriented so as to receive hinge pins in a vertical orientation, for example. In some embodiments, the latch-side molding may comprise a door latch channel positioned to receive a door latch bolt. The door system may additionally comprise a secondary door rotatably mounted to the primary door molding.

In exemplary embodiments, the door system additionally comprises a hinge-side mounting adapter, which may comprise a first attachment segment and a first channel segment, where the hinge-side molding comprises a first mounting adapter channel, where the first attachment segment is attached to the hinge-side jamb, and where the first channel segment is positioned in the first mounting adapter channel. The door system may additionally include a latch-side mounting adapter, which may comprise a second attachment segment and a second channel segment, where the latch-side molding comprises a second mounting adapter channel, where the second attachment segment is attached to the latch-side jamb, and where the second channel segment is positioned in the second mounting adapter channel. The primary door molding may be connected to the primary door frame by one or both of the hinge-side mounting adapter and the latch-side mounting adapter in such a way that the position of the primary door molding relative to the primary door frame is adjustable while the primary door molding cannot be non-destructively removed from the primary door frame.

In exemplary embodiments, the primary door frame and primary door molding comprise an integral construction. The latch-side molding may comprise a door latch channel. The primary door molding may comprise hinge pins in one or both of the hinge-side molding and the top molding, for example, the primary door molding may comprise a hinge pin on the underside of the top molding at a position near the hinge-side molding, or the hinge-side molding may comprise a hinge plate at a position near or at the bottom of the hinge side molding, the hinge plate comprising a hinge pin.

In another aspect, the present disclosure provides methods of installing a primary/secondary door system in a door opening in a commercial or residential building, comprising: a) providing a door system comprising: i) a primary door frame comprising a hinge-side jamb, a latch-side jamb, a head, and a sill; and ii) a primary door molding comprising a hinge-side molding, a latch-side molding, and a top molding attached to the primary door frame, wherein the primary door molding is adapted for rotatably mounting a secondary door; and iii) optionally a primary door rotatably mounted to the primary door frame; b) mounting the primary/secondary door system in a door opening in a commercial or residential building; c) optionally anchoring or attaching the primary door molding to a building surface surrounding the door opening; and d) optionally rotatably mounting a secondary door on the primary door molding.

The preceding summary of the present disclosure is not intended to describe each embodiment of the present invention. The details of one or more embodiments of the invention are also set forth in the description below. Other features, objects, and advantages of the invention will be apparent from the description and from the claims.

In this application, the following terminology applies: “Integral” or “integral construction” refer to a construction that is a single piece, though it may comprise elements that can be separately named, that may be a unitary article, or that may be formed from multiple pieces where multiple pieces are permanently joined (such as by welding, permanent adhesive, permanent fasteners, or methods that cannot be reversed non-destructively) to form a single piece construction. “Unitary” or “unitary article” refer to an article that is a single piece, though it may comprise elements that can be separately named, that is formed from a single piece or aliquot of material without division of that piece or aliquot (such as by extruding, casting, stamping, molding, forging, machining, sculpting, or the like), and that lacks seams or joints between elements.

All scientific and technical terms used herein have meanings commonly used in the art unless otherwise specified.

As used in this specification and the appended claims, the singular forms "a", "an", and "the" encompass embodiments having plural referents, and the term "or" is generally employed in its sense including "and/or" unless the content clearly dictates otherwise.

As used herein, "have", "having", "include", "including", "comprise", "comprising" or the like are used in their open ended sense, and generally mean "including, but not limited to." It will be understood that the terms "consisting of" and "consisting essentially of" are subsumed in the term "comprising," and the like.

BRIEF DESCRIPTION OF THE DRAWINGS

The present invention will be further explained with reference to the appended Figures, wherein like structure is referred to by like numerals throughout the several views, and wherein.

DETAILED DESCRIPTION

Figure 1:
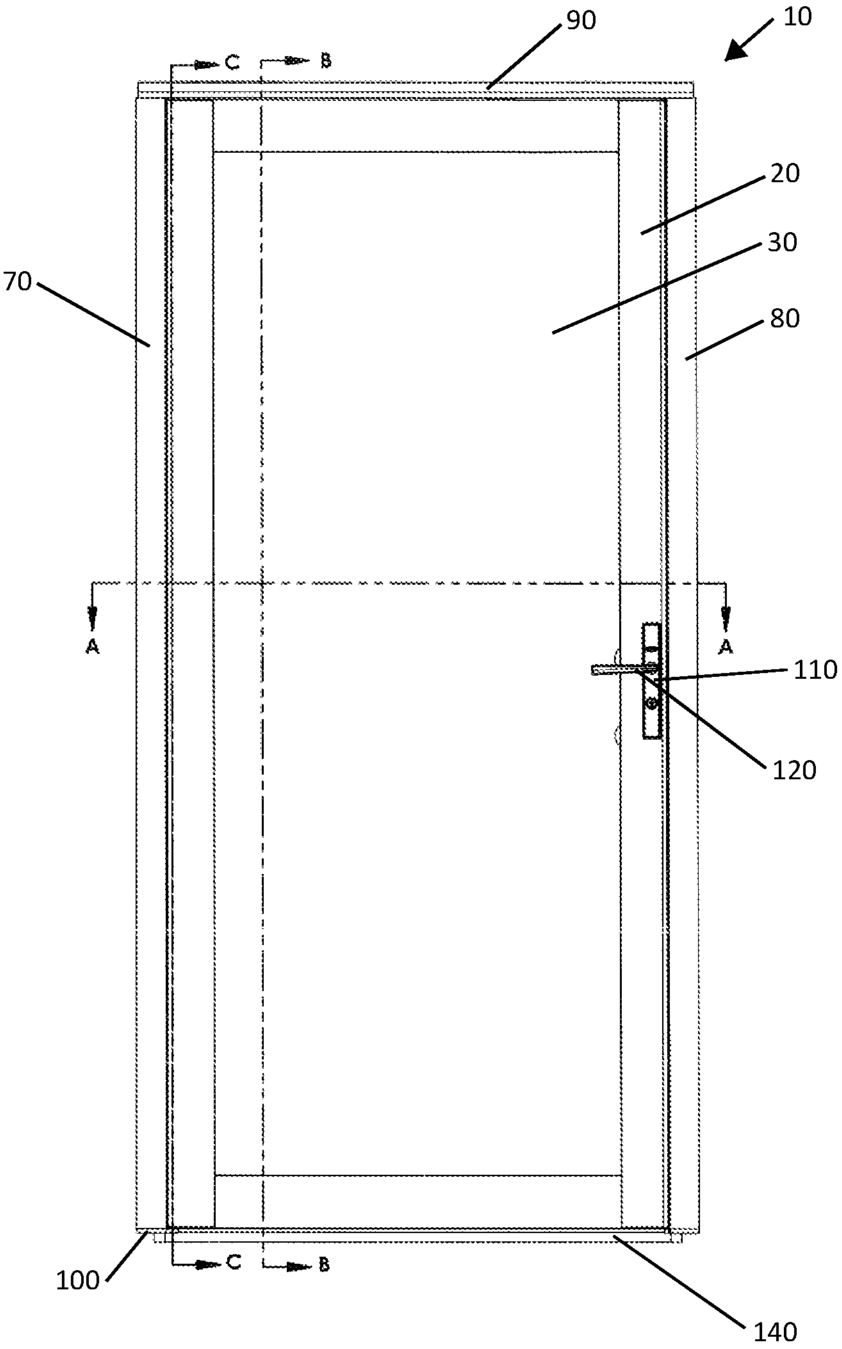
FIG. 1 is a front view of a primary/secondary door system as assembled with primary and secondary doors in a closed position.

The present disclosure describes primary/secondary door systems comprising primary door molding elements configured for mounting a secondary door adjacent to a primary door without requiring separate installation of a secondary door frame. The present primary/secondary door systems comprise a primary door frame (typically including hinge- and latch-side jambs, head, and sill) and the primary door molding (typically including hinge-side and latch-side molding and top molding) attached to each other. Optionally, these components form an integral construction. The primary/secondary door systems can additionally include a primary door rotatably attached by hinges or another attachment system to the primary door frame.

One or more secondary doors may be provided as part of a package or kit with the primary/secondary door system such that the building contractor or consumer may choose one or more coordinated doors in a system so that they can easily install a secondary door at a desired time. In other situations, a contractor provides and installs a "door-ready molding" to the primary door frame and a consumer can later purchase and install a secondary door. In some embodiments, one or more secondary doors may be changed seasonally by the consumer. Because installation is straightforward and generally able to be performed by a single person, it is therefore easy to remove and replace secondary doors, as desired. An embodiment of primary and secondary doors are hinged on the same side, (i.e., right or left), with the primary door opening inward and the secondary door opening outward, although opposite-side hinges are also contemplated.

In embodiments, primary door molding of the primary/secondary door system is configured to perform the functions of external molding (brick molding), including bridging the gap between the primary door frame and the building structure both to help prevent ingress of wind, water, insects or animals and to provide an attractive appearance, positioning the door system properly with respect to the building structure, and providing a surface against which the exterior cladding of the structure (brick, stone, vinyl or cement siding, cedar shingles, and the like) may be installed and sealed. Optionally, the primary door molding may be caulked after installation of the door system to assist in these functions. The primary door molding may be optionally anchored or attached to the building surface after installation of the door system. The primary door molding may have decorative cross-sectional profiles, including combinations of millwork features such as flutes, ogees, quarter-round features, and the like, and may additionally include decorative corner features. The primary door molding sections may have the same or contrasting cross-sectional profiles and may be adapted to accept add-on pieces for additional modification of appearance or style.

In addition, the primary door molding of the primary/secondary door systems of the present disclosure are configured to receive a secondary door, such that the installation of a secondary door frame in order to support a secondary door is unnecessary. The primary door molding can include multiple frame components, such as a hinge-side molding and/or top molding configured for mounting secondary door hinges or equipped with rotatably engageable elements that form a part of a secondary door hinge. In some embodiments, the hinge-side molding and/or top molding include one or more hinge pin receivers (typically holes or depressions), optionally fitted with bushings, positioned and adapted to receive one or more hinge pins mounted on a secondary door to form hinges. Alternatively, hinge pins may be mounted on the hinge-side molding or hinge end of the top molding and corresponding hinge pin receivers and bushings may be provided in the secondary door, or the secondary door may include one hinge pin and one hinge pin receiver.

The primary door molding may include a latch-side molding adapted to engage with latch mechanisms of a secondary door, such as the bolt of the secondary door latch. In exemplary embodiments, a latch-side molding includes a door latch channel positioned to receive the bolt of the secondary door latch. In exemplary embodiments, the latch-side molding includes a strike plate or is configured for mounting a strike plate positioned to receive the bolt of the secondary door latch. Alternatively, the primary door molding and secondary door may be rotatably connected by one or more traditional hinges comprising a leaf attached to the hinge-side molding, a leaf attached to the hinge side of the secondary door, and a hinge pin which is dropped through the hinge leaves once the door is placed near the hinge-side jamb and the hinge leaves are aligned.

The primary door molding may be mounted to the primary door frame by any suitable mechanism, including mechanical fastening devices such as screws, rivets, nails, staples, dowels, customized mechanical connectors, and the like, and may additionally or alternatively use adhesives, welding, or combinations thereof. Optionally, the primary door molding and primary door frame are permanently joined (such as by welding, permanent adhesive, permanent fasteners, or methods that cannot be reversed non-destructively) to form an integral construction. Optionally, the primary door molding and primary door frame are joined by projections such as hooks or pegs to engage receiving features such as V-shaped or keyhole-shaped holes. In some embodiments, including the embodiment illustrated in FIGS. 10 through 12*c* discussed below, the primary door molding includes mounting flanges which extend in a direction generally orthogonal to the plane of the closed position of the secondary door along an inner portion of the hinge-side and latch-side jambs. The primary door molding may be attached to the primary door frame by attachment of the mounting flanges to the inner portions of the hinge- and latch-side jambs.

In embodiments, including the embodiment illustrated in FIGS. 13 through 16 discussed below, a mounting adapter is additionally provided to assist in a desirable door installation that allows for at least some adjustability. Like the mounting flange discussed above, the mounting adapter may include an orthogonal portion which extends in a direction generally orthogonal to the plane of the closed position of the secondary door along an inner portion of the hinge- and latch-side jambs and may be attached to the inner portion of the hinge- and latch-side jambs. The mounting adapters additionally include channel segments which are positionable in mounting adapter channels provided in the hinge and/or latch-side moldings. This embodiment allows the primary door molding some degree of motion relative to the primary door frame so that the position and fit of the molding may be adjusted after installation, vertically or laterally, and the hinge- and latch-side moldings may be adjusted to true vertical orientation. Optionally, after installation of the primary/secondary door system and adjustment of the position of the primary door molding, the primary door molding may be affixed directly to elements of the primary door frame to eliminate this adjustability or play.

The various parts and elements of the primary/secondary door system may be made of any suitable materials, which are not particularly limited. Such materials may include exemplary materials including wood, metal (such as aluminum or steel), extruded or molded plastics, resin/matrix composites such as fiberglass, other suitable materials, or a combination of these or other suitable materials.

Figure 2:
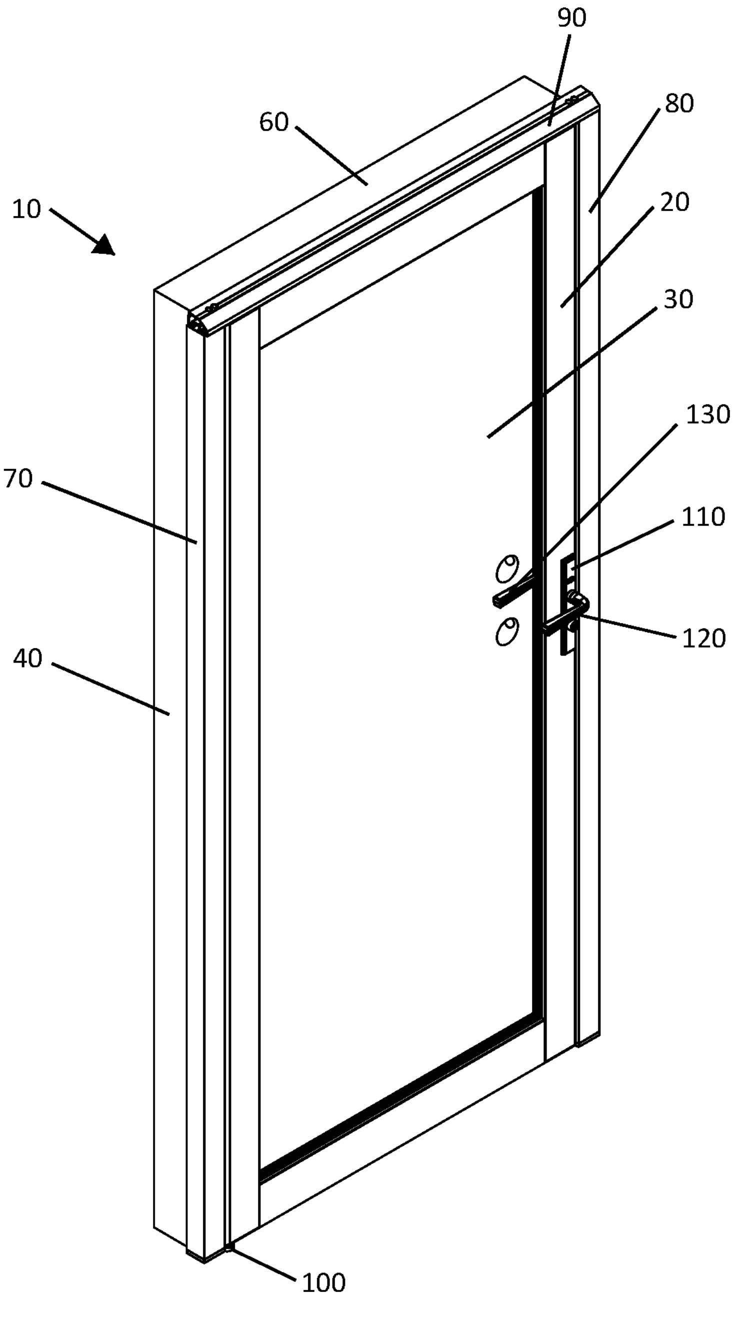
FIG. 2 is an isometric view of a primary/secondary door system as assembled with primary and secondary doors in a closed position.
Figure 3:
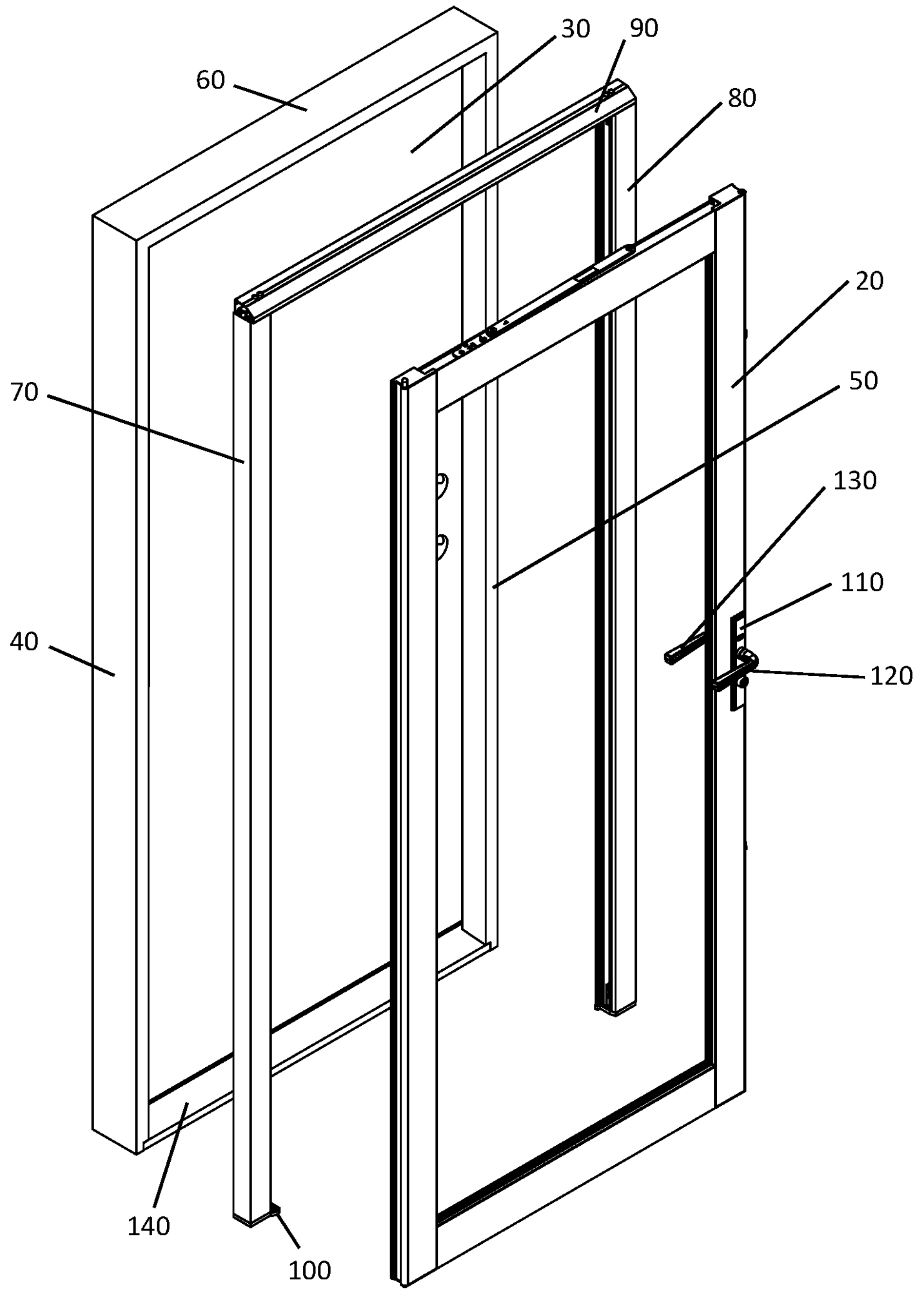
FIG. 3 is an exploded isometric view of a primary/secondary door system with the primary door in a closed position.

Referring to exemplary FIGS. 1 through 3, an assembled primary/secondary door system 10 is illustrated, which includes a secondary door 20 that is commonly referred to as a screen door, a storm door, or security door, for example. Secondary door 20 may be of any suitable style and may include single or multiple transparent panels, opaque panels, screening panels, metal or mesh grilles, and the like. In this illustrated embodiment, secondary door 20 comprises a glass panel through which primary door 30 is visible. Primary/secondary door system 10 additionally includes a hinge-side jamb 40, a latch-side jamb 50, a head 60, and a sill 140, which together comprise a primary door frame. Elements of the primary door frame may be fastened together by any suitable mechanism, including mechanical fastening devices such as screws, rivets, nails, staples, dowels, customized mechanical connectors, and the like, and may additionally or alternatively use adhesives, welding, or combinations thereof.

Primary/secondary door system 10 additionally comprises a hinge-side molding 70, a latch-side molding 80, and a top molding 90, which together comprise a primary door molding 90. Elements of the primary door molding 90 may be fastened together by any suitable mechanism, including mechanical fastening devices such as screws, rivets, nails, staples, dowels, customized mechanical connectors, and the like, and may additionally or alternatively use adhesives, welding, or combinations thereof. The primary door molding 90 may additionally utilize intermediate structures in combination with mechanisms such as inserts comprising two perpendicular legs positioned in each corner. Likewise, the primary door molding 90 may be attached to the primary door frame by any suitable mechanism, including mechanical fastening devices such as screws, rivets, nails, staples, dowels, customized mechanical connectors, and the like; adhesives; welding; or combinations thereof.

In embodiments, the combination of the primary door molding 90 and the primary door frame are configured as an integral construction. In some embodiments, hinge-side jamb 40 and hinge-side molding 70 are a unitary article (i.e. a single unified part such as would be made in a single molding, extrusion, or machining). Similarly, latch-side jamb 50 and latch-side molding 80 may be a unitary article, and/or head 60 and top molding 90 may be a unitary article. In embodiments, it is possible for only a single molding to be provided that cooperates with other structure(s) for mounting of a secondary door.

In an embodiment, hinge-side molding 70 comprises an extending hinge plate or element 100 with a rotatably engageable element (e.g. an aperture or pin-receiving member) that receives a hinge pin (not visible in FIGS. 1-3) extending from secondary door 20. In embodiments, the hinge plate or element 100 extends from a distal end of the hinge-side molding 70; however, the hinge plate or element 100 can be spaced vertically from the distal end of the hinge-side molding.

Secondary door 20 includes secondary door hardware 110 with secondary door exterior handle 120 and secondary door interior handle 130, which may include any of a number of available door hardware configurations. The present figures illustrate a left-hinge out-swinging secondary door 20 and a left-hinge in-swinging primary door 30; however, it is understood that any combinations of left-hinge and right-hinge primary and secondary doors are also contemplated. Optionally, the position of the inner edge of at least one of hinge-side molding 70 and latch-side molding 80, are adjustable (e.g., by provision of a telescoping or extending sections, so that the inside edge of the molding can be adjusted before, while, or after secondary door is attached to the molding in order to get the proper spacing and clearance between the molding and the secondary door).

Figures 4A, 4B, 4C:
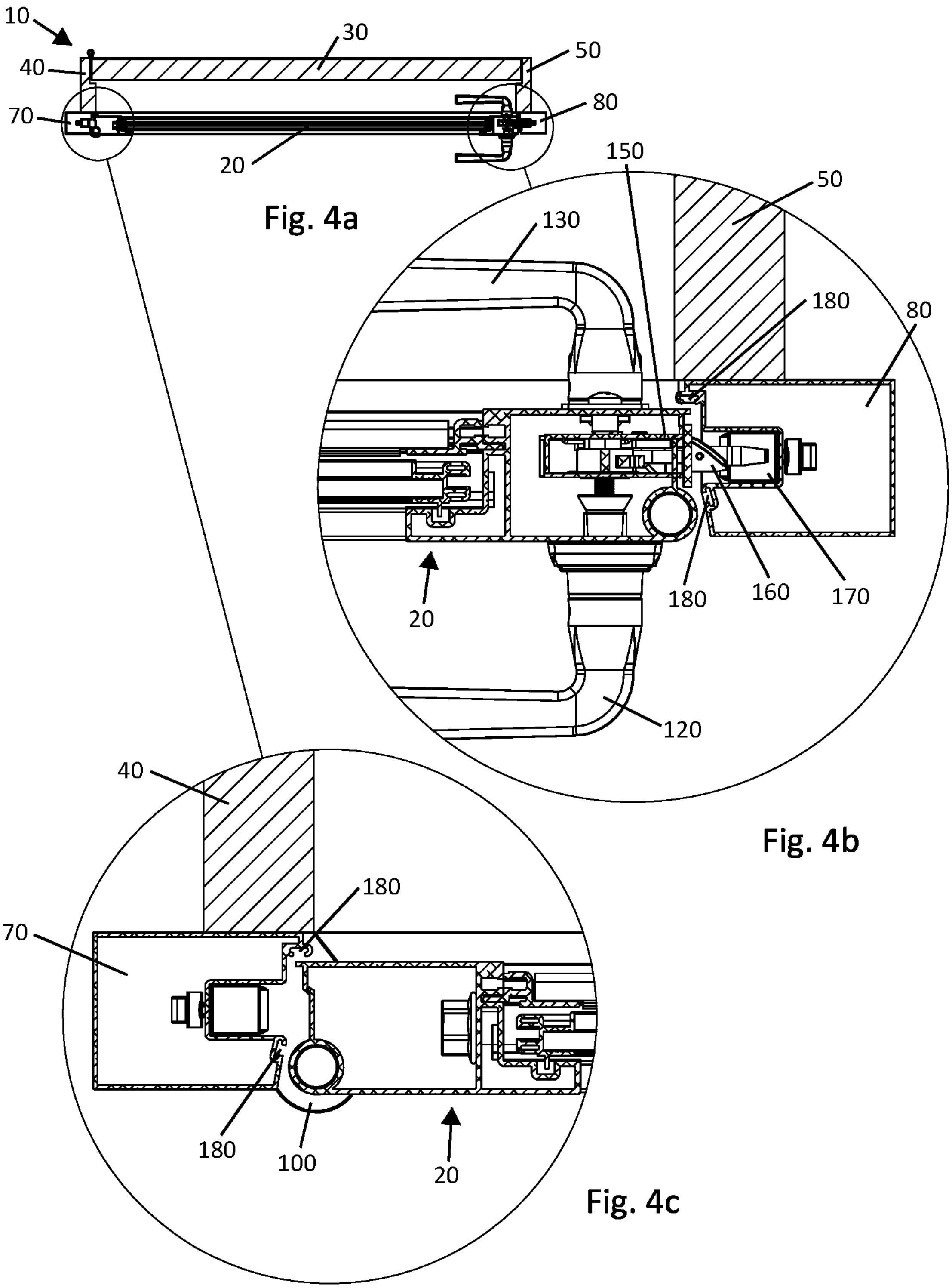
FIGS. 4*a*, 4*b*, and 4*c* are cross-sectional views of the primary/secondary door system of FIG. 1 taken along section line A-A (FIG. 4*a*), along with enlarged views of a secondary door latch mechanism and a latch-side molding (FIG. 4*b*) and of a hinge-side molding (FIG. 4*c*)

FIGS. 4*a*, 4*b* and 4*c* include cross-sectional views taken along section line A-A of FIG. 1 of a secondary door latch mechanism and latch-side molding 80 (FIG. 4*b*) and of hinge-side molding 70 (FIG. 4*c*). With particular reference to FIG. 4*b*, a secondary door exterior handle 120 and secondary door interior handle 130 may be used to operate secondary door latch mechanism 150 to withdraw secondary door latch bolt 160. Secondary door latch bolt 160 engages with secondary door latch channel 170 to hold the secondary door 20 closed. In some embodiments, secondary door latch channel 170 is continuous down the length of latch-side molding 80 such that latch-side molding 80 has a constant cross section and may therefore be produced by a continuous process such as an extrusion process. In various embodiments, one, two, or all three of hinge-side molding 70, latch-side molding 80, and top molding 90 have a constant cross section and may therefore be produced by a continuous process such as an extrusion process. In embodiments, hinge-side molding 70 may also include secondary door latch channel 170 to accommodate left-opening and right-opening door installations, and so that hinge-side molding 70 and latch-side molding 80 have the same profile (flipped end to end) and can therefore be made in the same process.

With reference to FIGS. 4*b* and 4*c*, weatherstrip channels 180 can be provided to hold flexible weatherstrip (not shown) so that secondary door 20, acting together with primary door molding 70, 80, and 90, may provide a barrier to wind, precipitation, and insects and other pests. In the depicted embodiment, weatherstrip channels 180 are located so that weatherstrip is not visible when secondary door 20 is closed. Since weatherstrip is often not paintable, this reduces the amount of visible surface and enables a more attractive door system having no visible unpaintable surfaces (in the closed position), other than transparent or screen panels (when present).

Figure 5A:
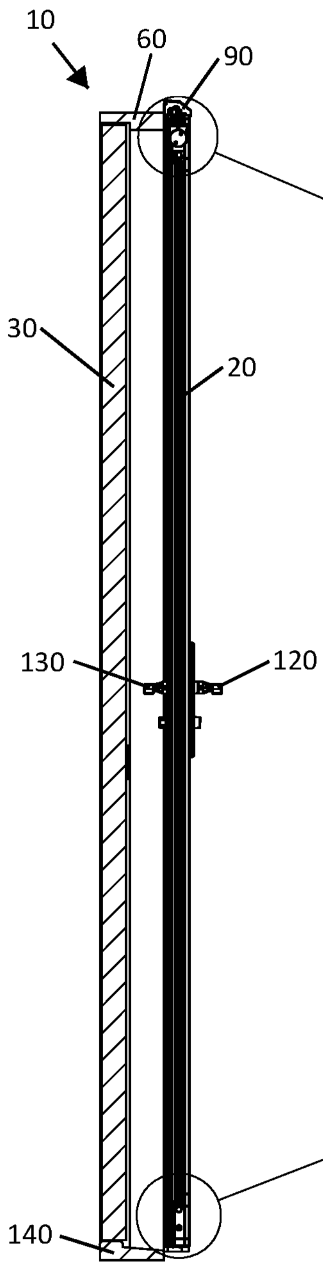
FIGS. 5*a*, 5*b*, and 5*c* are cross-sectional views of the primary/secondary door system of FIG. 1 taken along section line B-B (FIG. 5*a*), along with enlarged views of a top molding and top details of a secondary door (FIG. 5*b*) and of bottom details of a secondary door (FIG. 5*c*)
Figure 5B:
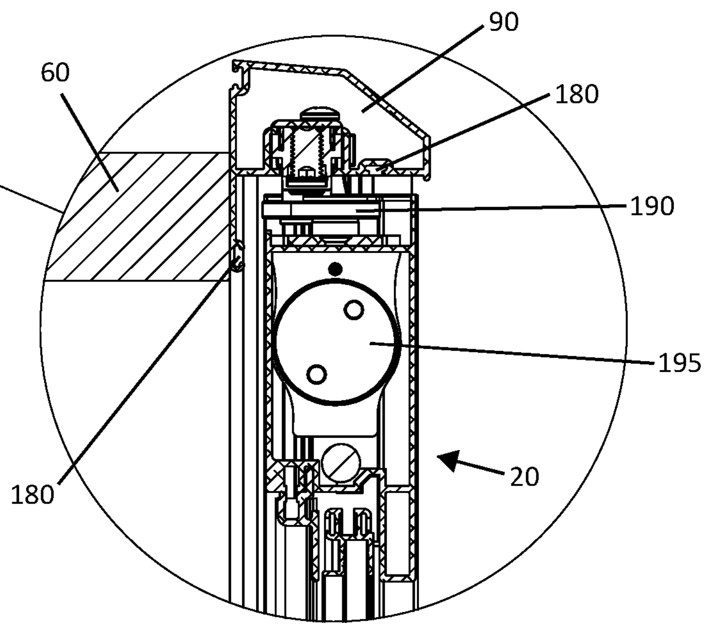
Figure 5C:
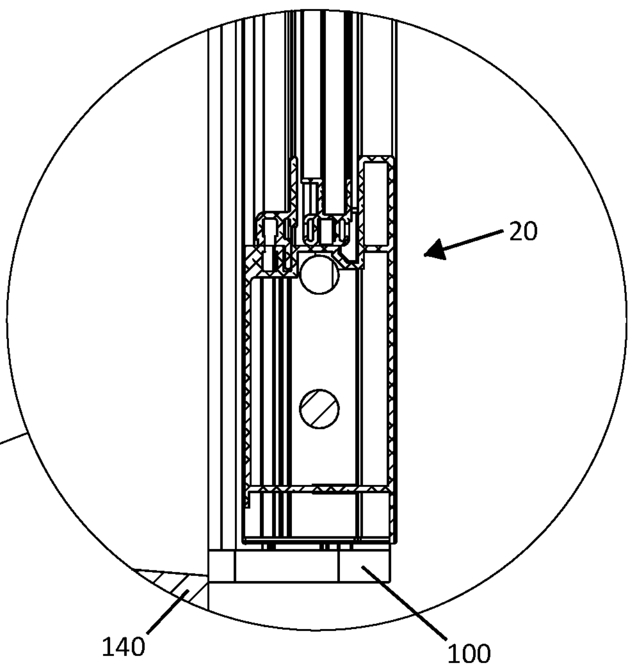

FIGS. 5*a*, 5*b* and 5*c* include cross-sectional views taken along section line B-B of FIG. 1 and illustrate top molding 90 and top details of secondary door 20 (FIG. 5*b*) and bottom details of secondary door 20 (FIG. 5*c*). In the illustrated embodiment, weatherstrip channels 180 are located such that weatherstrip is not visible when secondary door 20 is closed, as addressed above. A door closer arm 190 and door closer 195 optionally form a part of a door-mounted door closer mechanism. Door closer arm 190 is visible in an extended position in FIGS. 6*a*, 7*a*, 8*a*, and 9*a*. With a door-mounted door closer system, the closer is concealed in the top of the door. Alternately, a frame-mounted door closer system may be used, in which case the closer may be housed in the top molding, or the door closer may be omitted. In other alternate embodiments, closer arm 190, which is a straight arm, may be replaced with a hinged arm made from two or more segments. Door closers disclosed in U.S. patent application Ser. Nos. 15/382,275, 15/385,091, 15/911,639, 15/911,690, and 16/914,850, which are incorporated herein by reference, may be used in the practice of the present door systems. The primary door may additionally be equipped with a door-mounted or frame-mounted closer.

Figure 6A:
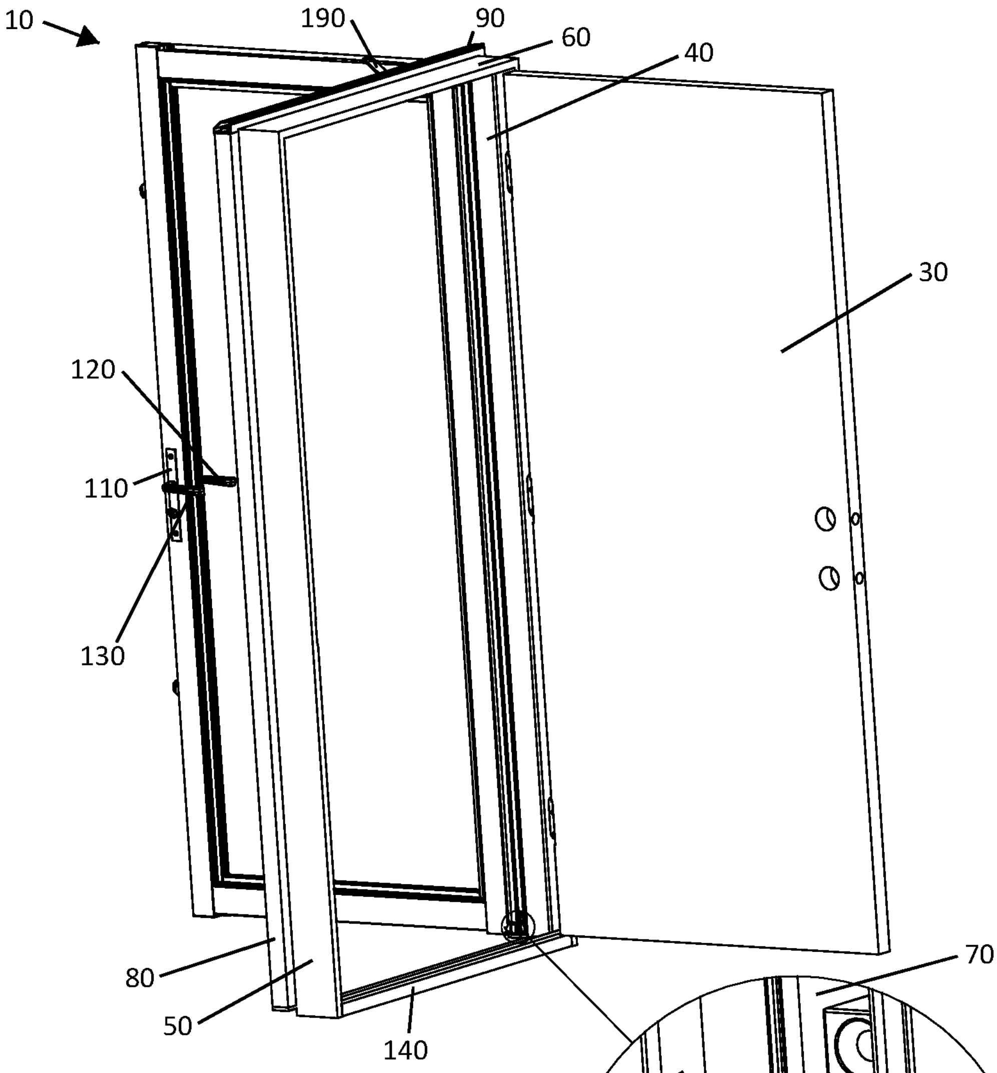
FIGS. 6*a* and 6*b* are isometric views of a primary/secondary door system as assembled with primary and secondary doors in an open position (FIG. 6*a*) and an enlarged view of a bottom hinge mechanism with a cutaway of the hinge pin mechanism of the secondary door (FIG. 6*b*)
Figure 6B:
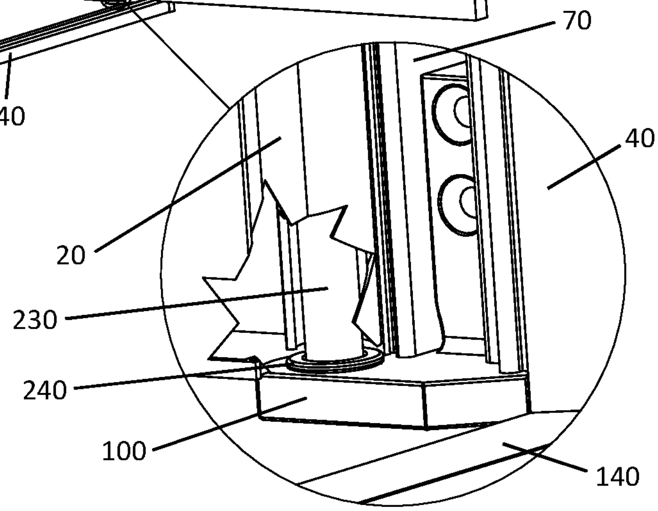
Figure 7A:
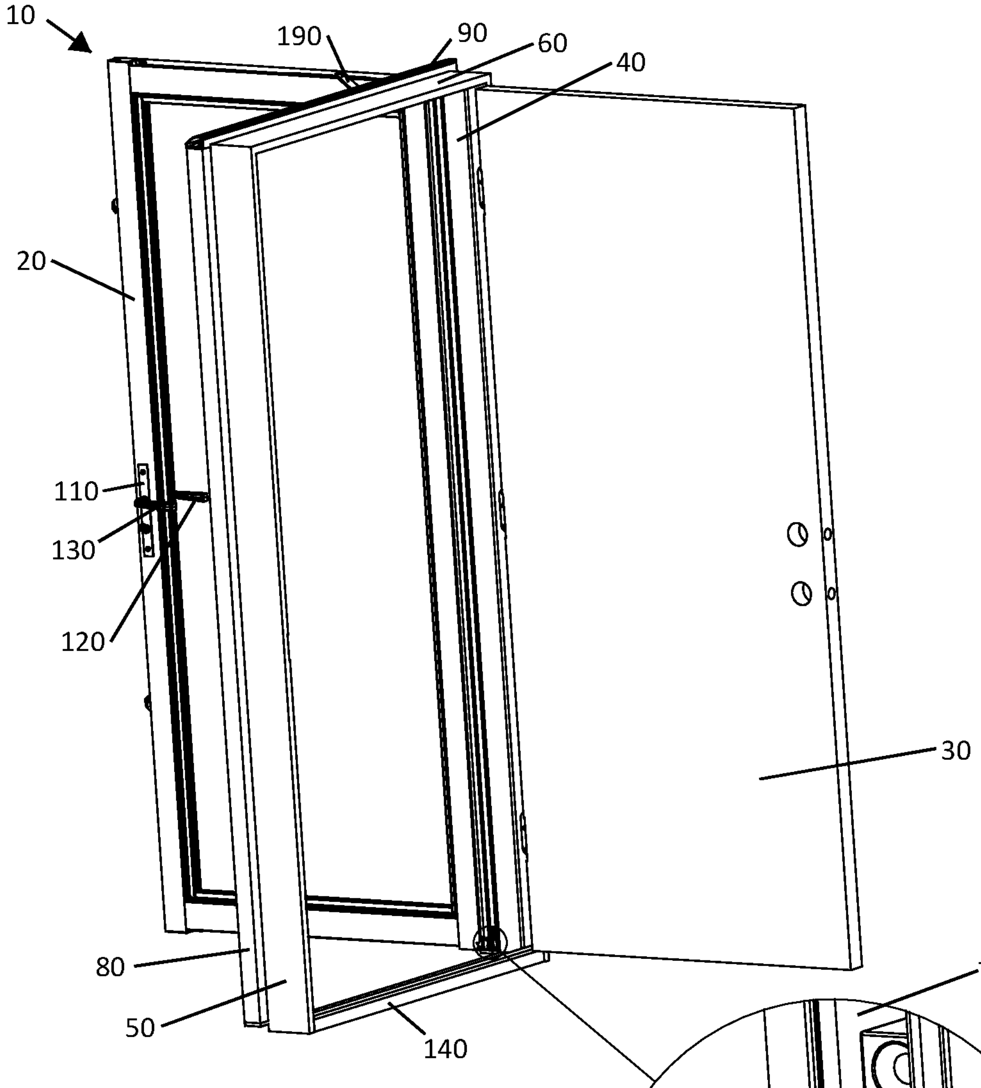
FIGS. 7*a* and 7*b* are isometric views of a primary/secondary door system as assembled with primary and secondary doors in an open position (FIG. 7*a*) and an enlarged view of a bottom hinge mechanism with the secondary door removed (FIG. 7*b*)
Figure 7B:
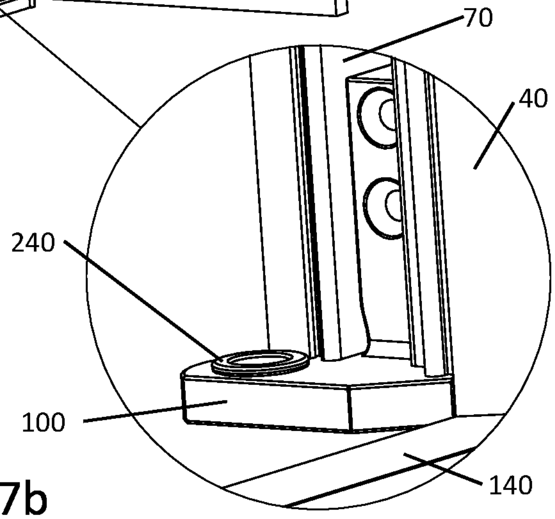

FIGS. 6*a* and 7*a* are views of an exemplary door system with primary and secondary doors in an open position, and FIGS. 6*b* and 7*b* are enlarged views of a bottom hinge mechanism. In particular, FIG. 6*b* illustrates a cutaway of the bottom hinge area with a hinge pin of a secondary door 20 engaged with the hinge mechanism, and FIG. 7*b* is an enlarged view of elements of a bottom hinge mechanism without the secondary door. The bottom hinge mechanism includes a rotatably engageable element in the form of a hinge pin 230 extending from the secondary door 20 and an optional bottom hinge bushing 240 installed in an aperture (not visible) provided in the hinge plate 100 to form a rotatably engageable element or hinge pin receiver. Optionally, the hinge-side molding 70 and hinge plate 100 form an integral construction. Bottom hinge pin 230 engages with bottom hinge bushing 240 to form a bottom hinge which bears the greater part of the weight of and provides an axis for rotation of secondary door 20.

With regard to the bottom hinge mechanism or rotatably engageable element, it is contemplated that such a feature is a part of the sill of a primary door frame rather than a hinge plate as described above. In such a configuration, the sill can include either an extending pin or an aperture (which can include a bushing) that is engageable with a corresponding aperture or pin of a secondary door for rotatable engagement between the components. The top of the secondary door will then be rotatably engageable with either a rotatably engageable element of the top molding or of a hinge plate extending from an upper area of a hinge-side molding.

Figures 8A, 8B:
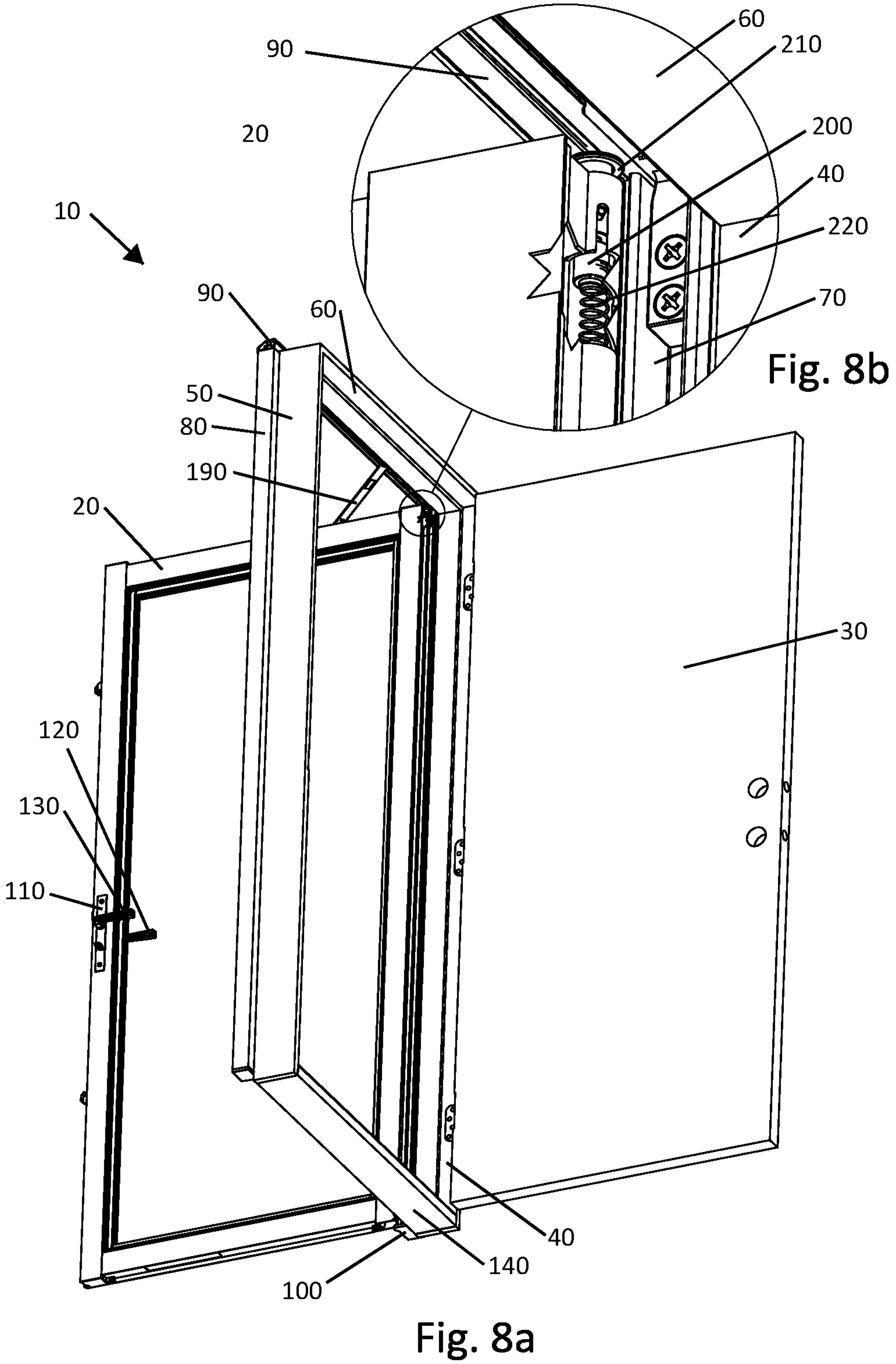
FIGS. 8*a* and 8*b* are isometric views of a primary/secondary door system as assembled with primary and secondary doors in an open position (FIG. 8*a*) and an enlarged view of a top hinge mechanism with a cutaway of the hinge pin mechanism of the secondary door (FIG. 8*b*)
Figure 9B:
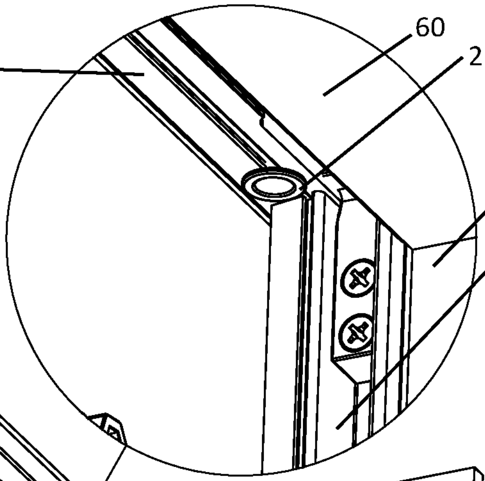
FIGS. 9*a* and 9*b* are isometric views of a primary/secondary door system as assembled with primary and secondary doors in an open position (FIG. 9*a*) and an enlarged view of a top hinge mechanism with the secondary door removed (FIG. 9*b*)
Figure 9A:
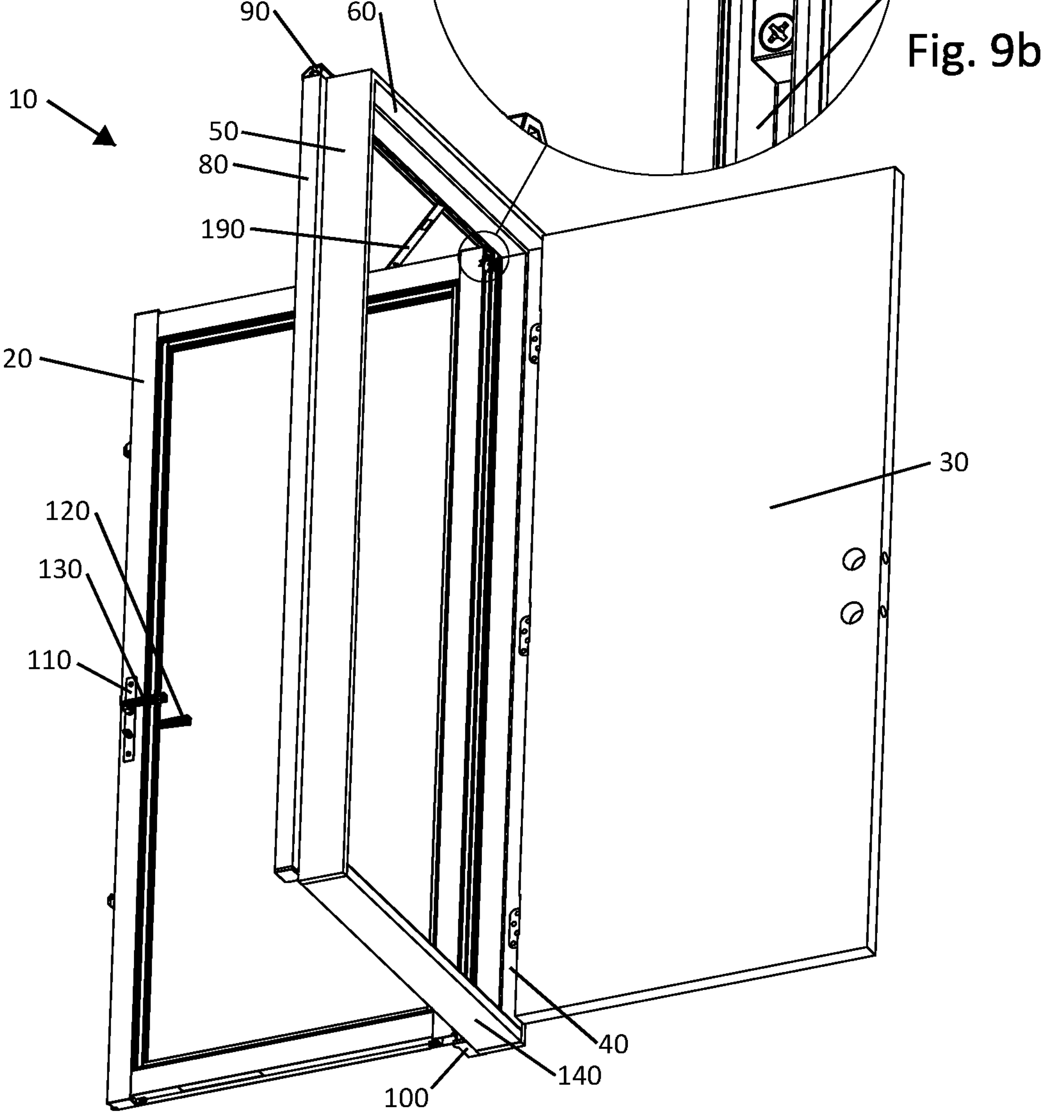
Figure 10:
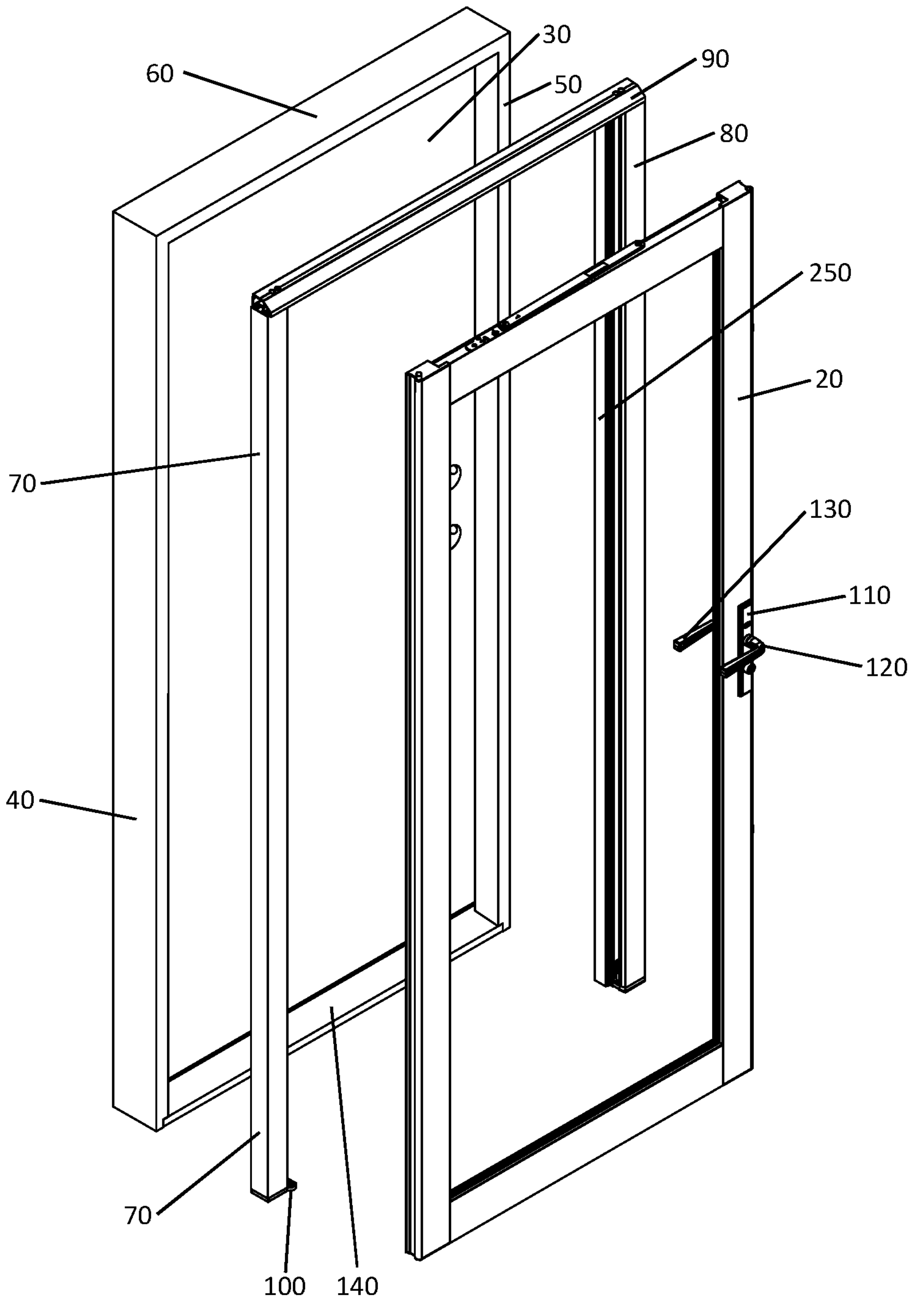
FIG. 10 is an exploded isometric view of a primary/secondary door system with the primary door in a closed position.
Figure 11A:
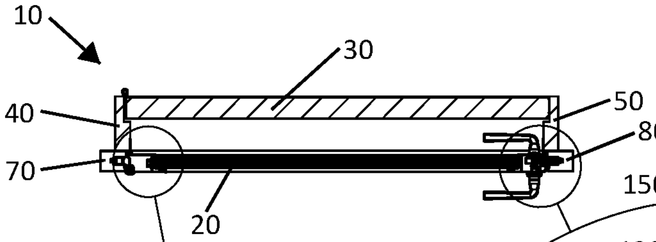
FIGS. 11*a*, 11*b* and 11*c* are cross-sectional views of the primary/secondary door system of FIG. 10 taken along a section line in the same location as section line A-A of FIG. 1 (FIG. 11*a*), and enlarged views of a secondary door latch mechanism and a latch-side molding (FIG. 11*b*) and of a hinge-side molding (FIG. 11*c*)
Figure 11B:
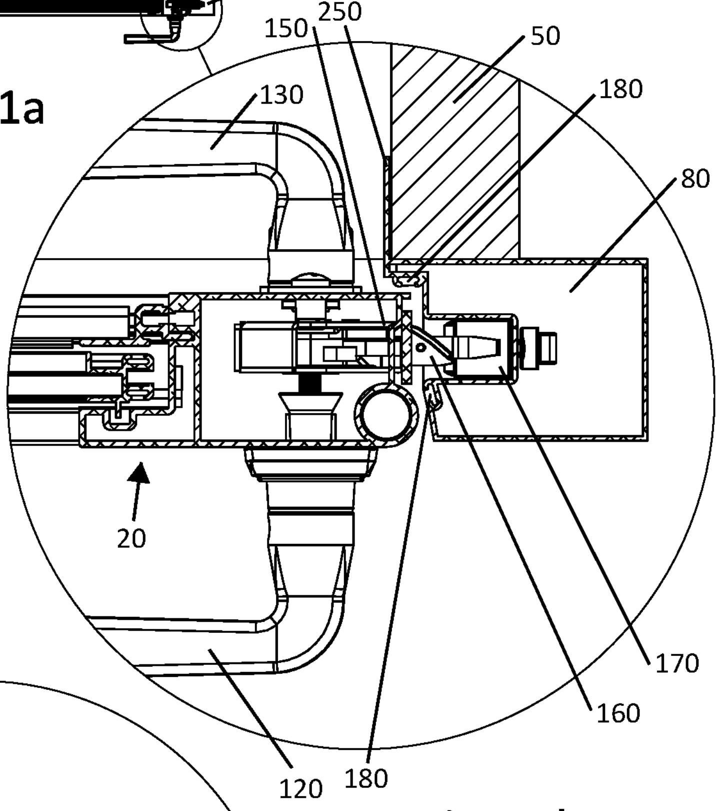
Figure 11C:
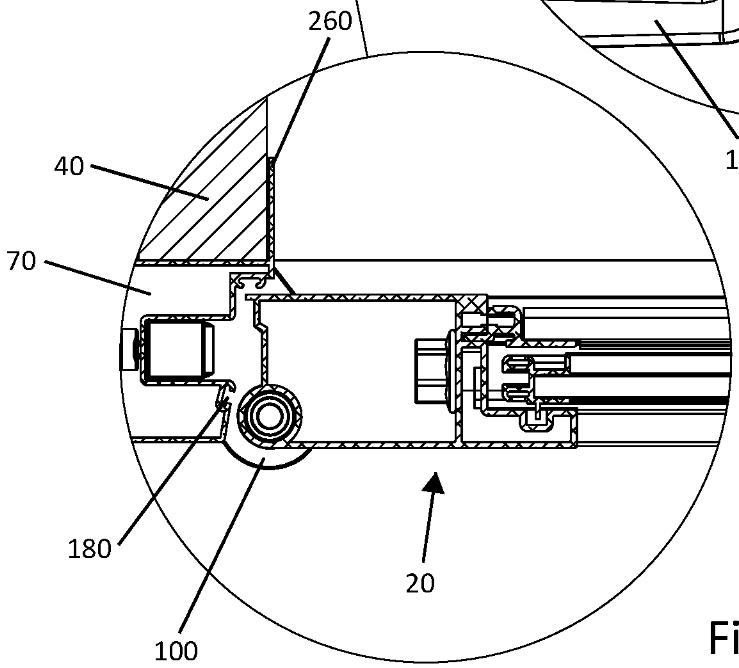
Figures 12A, 12B, 12C:
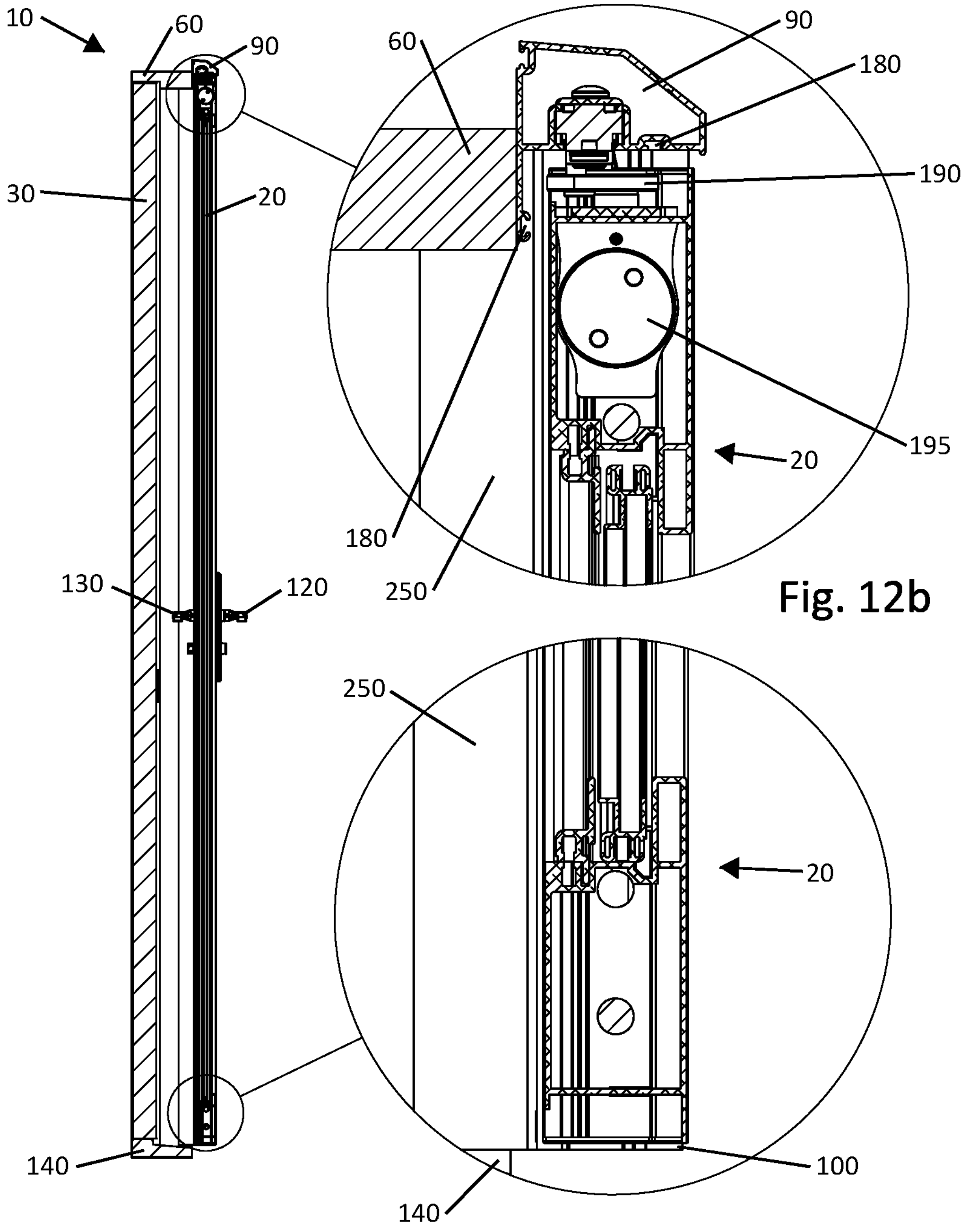
FIGS. 12*a*, 12*b* and 12*c* are cross-sectional views of the primary/secondary door system of FIG. 10 taken along a section line in the same location as section line B-B of FIG. 1 (FIG. 12*a*), and enlarged views of a top molding and top details of a secondary door (FIG. 12*b*) and of bottom details of a secondary door (FIG. 12*c*)
Figure 13:
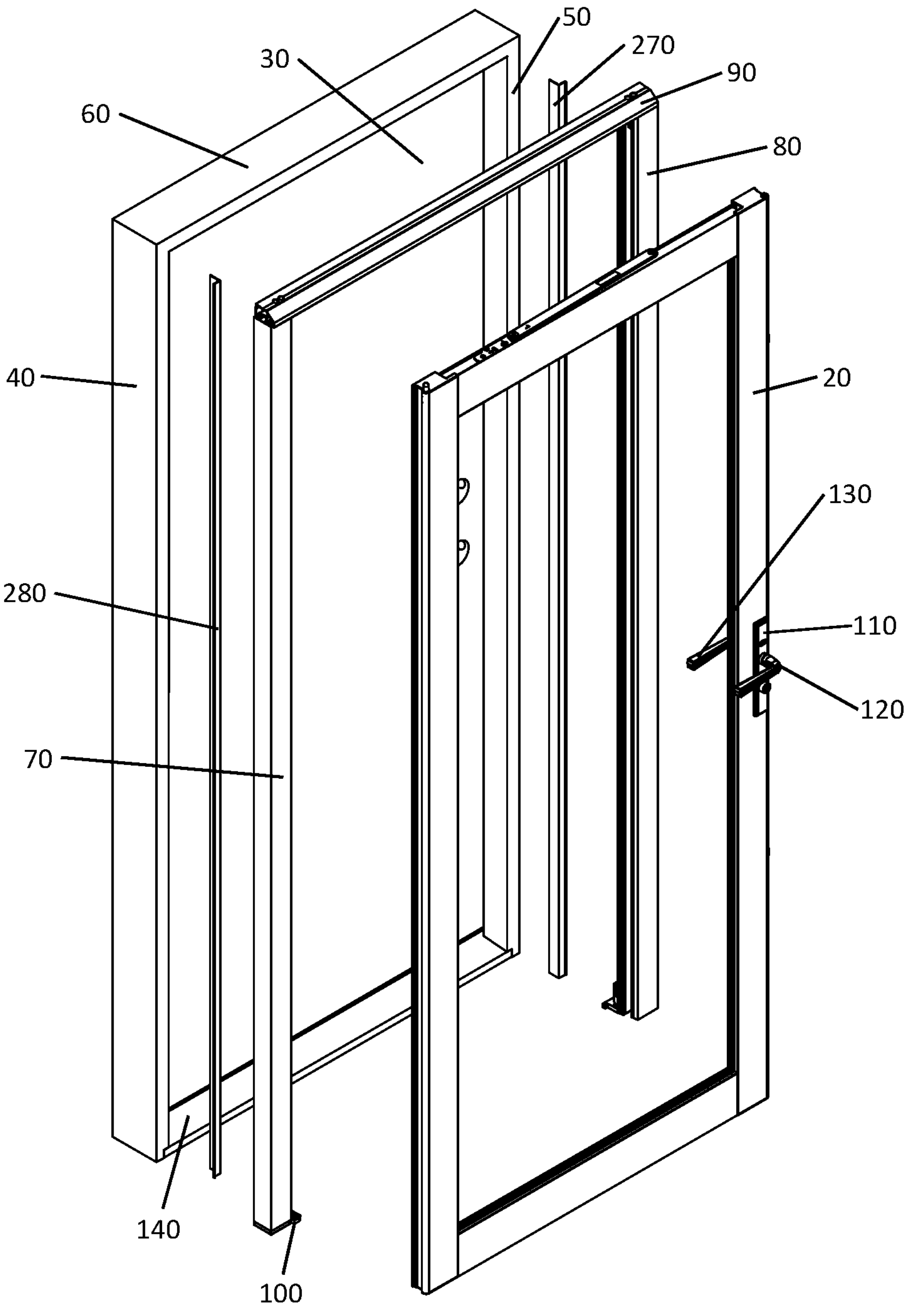
FIG. 13 is an exploded view of a primary/secondary door system with the primary door in a closed position.
Figures 14A, 14B, 14C:
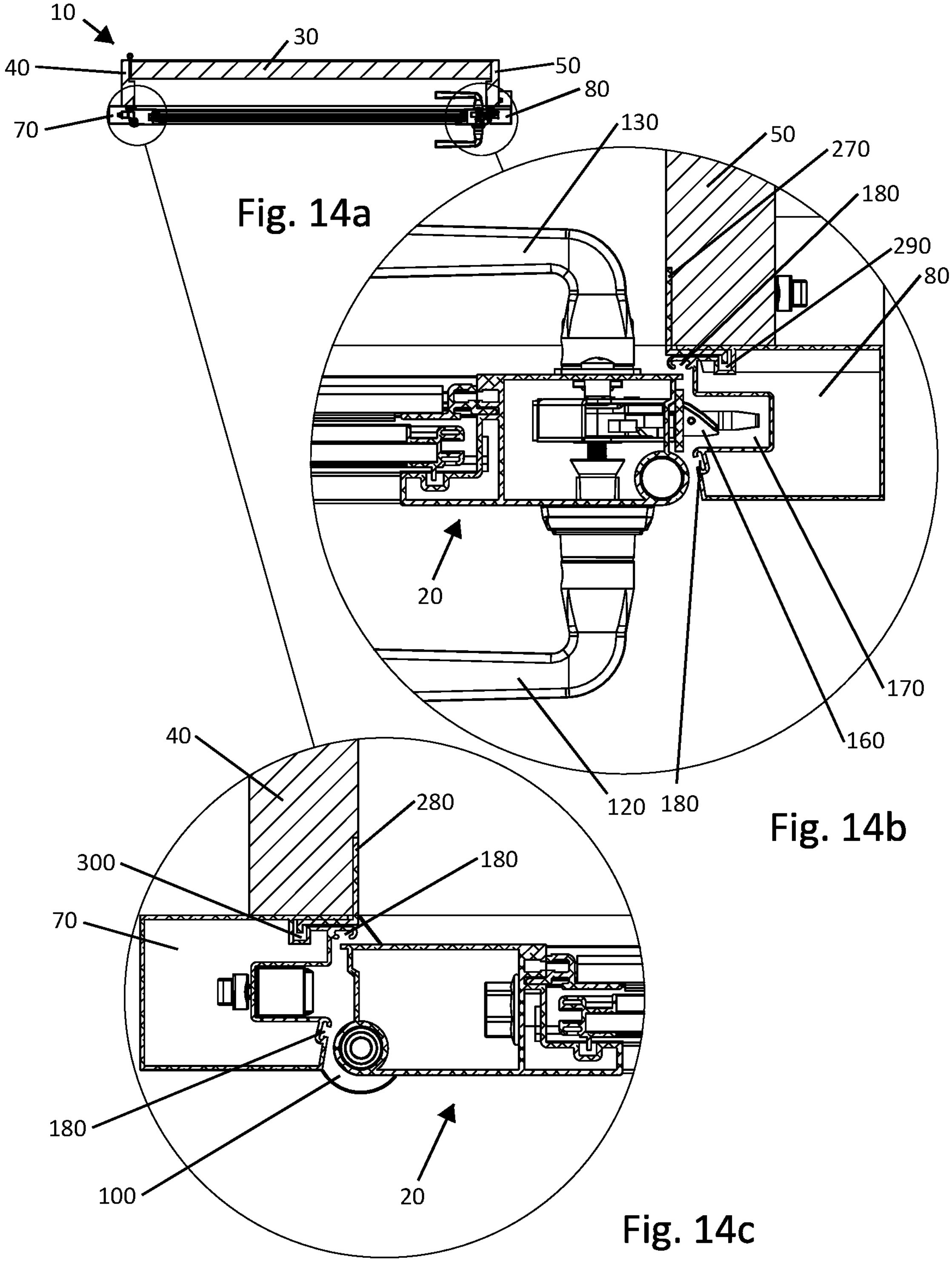
FIGS. 14*a*, 14*b* and 14*c* are horizontal cross-sectional views of the primary/secondary door system of FIG. 13 taken along a section line in the same location as section line A-A of FIG. 1 (FIG. 14*a*) and enlarged views of a secondary door latch mechanism and a latch-side molding (FIG. 14*b*) and of a hinge-side molding (FIG. 14*c*)
Figures 15A, 15B, 15C:
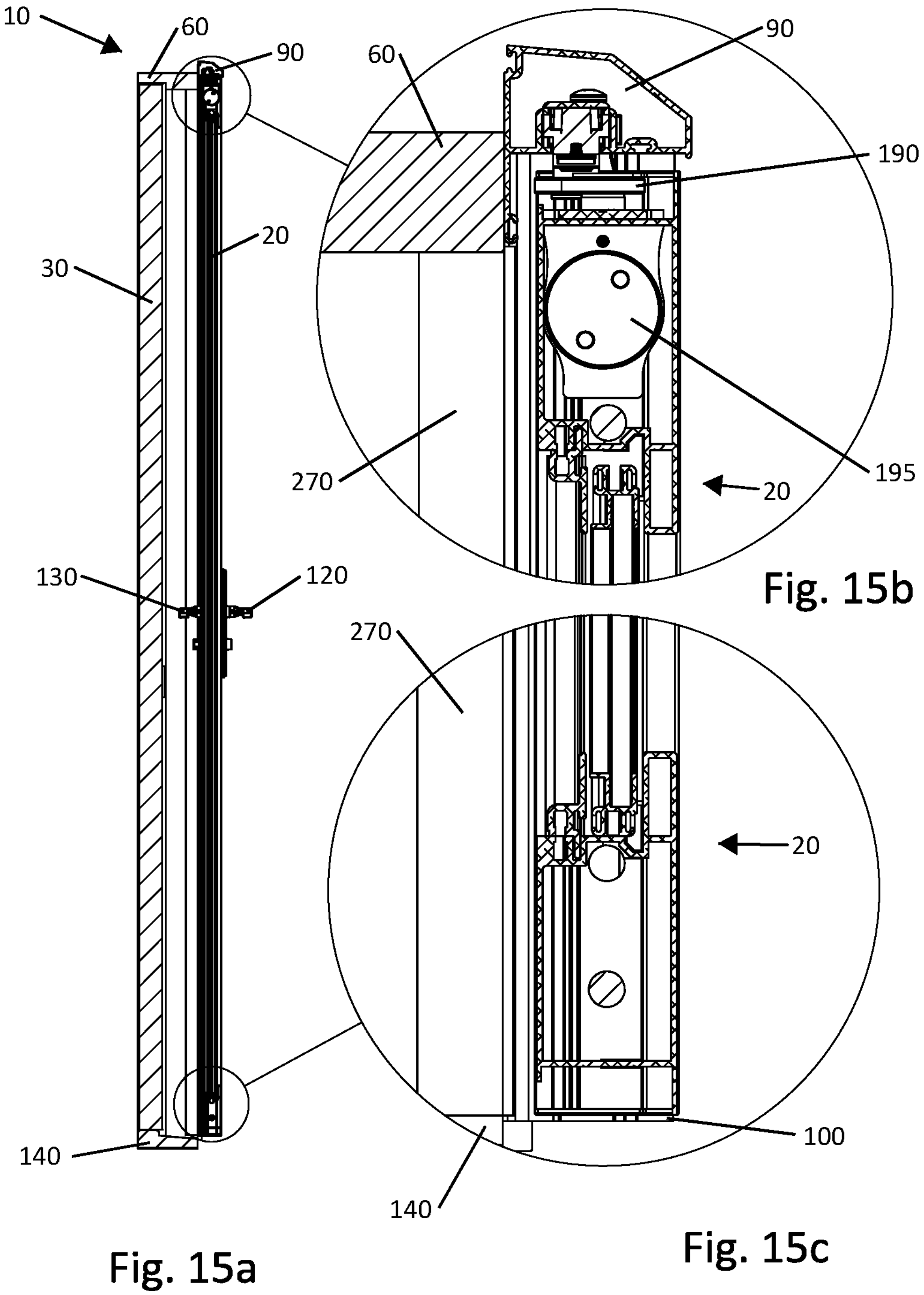
FIGS. 15*a*, 15*b* and 15*c* are vertical cross-sectional views of the primary/secondary door system of FIG. 13 taken along a section line in the same location as section line B-B of FIG. 1 (FIG. 15*a*), and enlarged views of a top molding and top details of a secondary door (FIG. 15*b*) and of bottom details of a secondary door (FIG. 15*c*)
Figure 16:
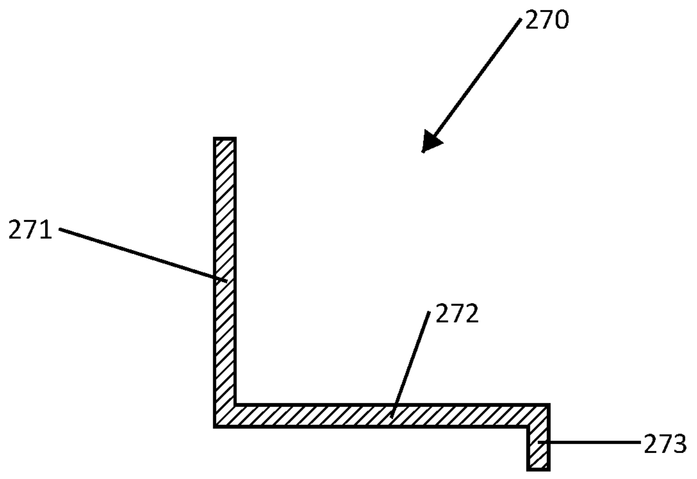
FIG. 16 is a cross-section of a mounting adapter of the type illustrated in FIG. 13.

FIGS. 8*a*, 8*b*, 9*a*, and 9*b* illustrate a top hinge mechanism of one embodiment of an assembled primary/secondary door system 10. FIG. 8*b* is an enlarged view of the top hinge mechanism with a cutaway of the hinge pin mechanism internal to secondary door 20. FIG. 9*b* is an enlarged view of elements of a top hinge mechanism without the secondary door. The top hinge mechanism includes a rotatably engageable element in the form of a top hinge pin 200, a top hinge bushing 210 installed in an aperture (not visible) provided in the top molding 90 to form a hinge pin receiver, and a top hinge pin biasing member 220. Hinge pin biasing member 220, which can include a spring, urges top hinge pin 200 to an extended position. During installation, after a bottom hinge pin (e.g., hinge pin 230) is engaged with a rotatably engageable element (e.g., a bottom hinge bushing), top hinge pin 200 may be pushed against hinge pin biasing member 220, located in alignment with top hinge bushing 210, and allowed to revert to an extended position to engage with the rotatably engageable element to form a top hinge. However, it is understood that both the bottom hinge pin 230 and top hinge pin 200 may be retractable and extendable, or that only the bottom hinge pin 230 is retractable and extendable.

Figure 17B:
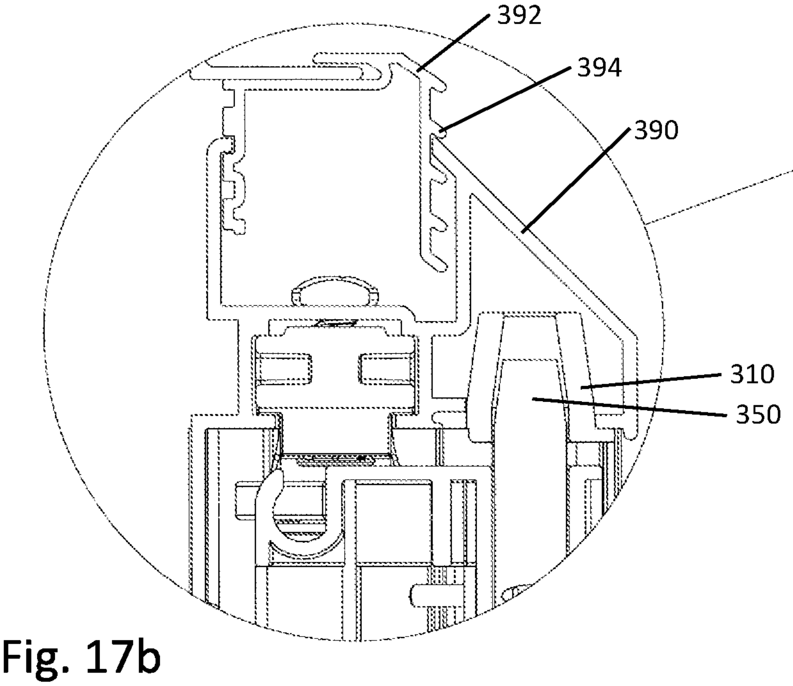
FIGS. 17*a*, 17*b*, and 17*c* are vertical cross-sectional views of the primary/secondary door system of FIG. 1 taken along section line C-C (FIG. 17*a*), along with enlarged views of a top molding and top details of a secondary door (FIG. 17*b*) and of bottom details of a secondary door (FIG. 17*c*).
Figure 17A:
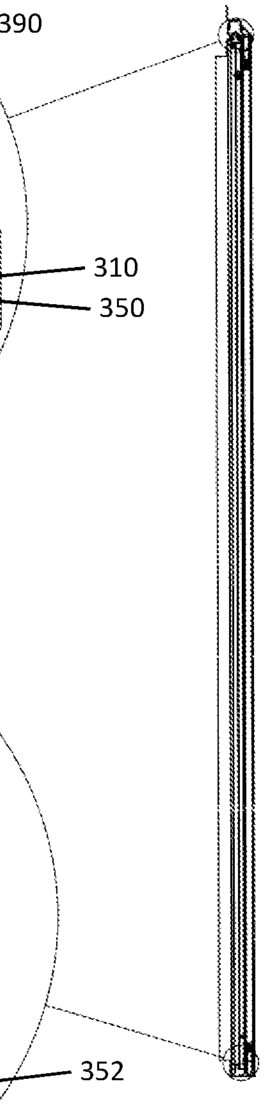
Figure 17C:
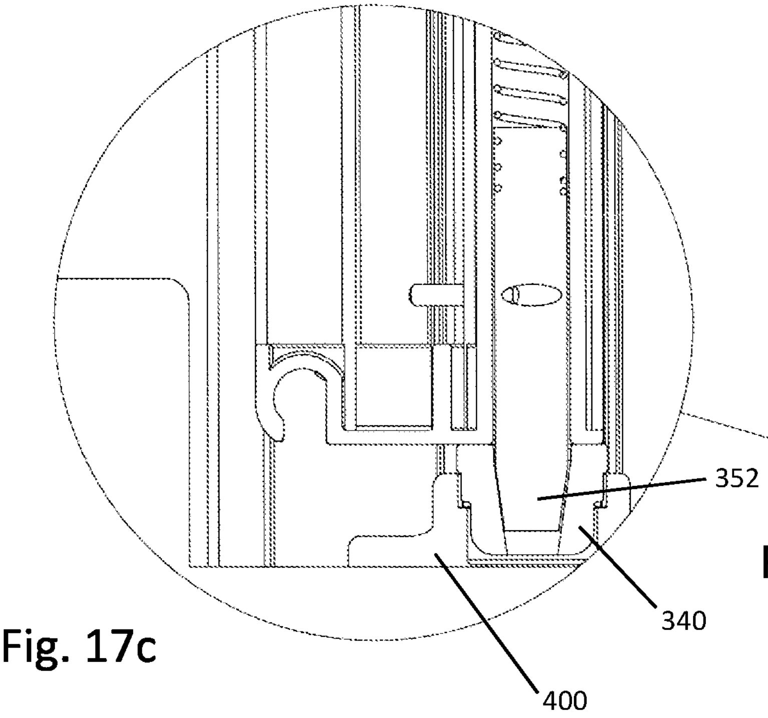

FIGS. 17*a*, 17*b* and 17*c* include cross-sectional views taken along section line C-C of FIG. 1 and illustrate enlarged views of a top molding 390 engaged with a rotatably engageable element of a secondary door (FIG. 17*b*) and bottom details of a rotatably engageable element of a secondary door engaged with a hinge plate 400 (FIG. 17*c*). In particular, FIG. 17*b* illustrates top molding 390 with an aperture in which a bushing 310 is positioned. As shown, the bushing 310 is tapered to provide a cone-shaped inner aperture configured to accept an inserted pin 350 with a tapered distal end. Similarly, FIG. 17*c* illustrates a hinge plate 400 that extends from a vertical molding and that includes an aperture in which a bushing 340 is positioned. As shown, the bushing 340 is tapered to provide a cone-shaped inner aperture configured to accept an inserted pin 352 with a tapered distal end. The tapered portions of the pins 350, 352 cooperate with the tapered portions of their respective bushings 310, 340 to help the pins 350, 352 self-align and self-center themselves, thereby providing for an easier installation. While these tapered members are illustrated both at the top and the bottom of the hinge-side molding 70, it is understood that such tapered elements may only be provided at one of these locations.

With further reference to FIG. 17*a*, an optional top molding extender 392 is engaged with the top molding 390. As shown, the top molding extender 392 is configured with multiple extensions 394 that are adjustably engageable with structure of the top molding 390 and/or other structure to achieve a desired vertical positioning of the top molding extender relative to the structure to which the door molding is installed. Other top molding extender positioning mechanisms are contemplated, including but not limited to detents, mating grooves, fasteners, friction, adhesives, and the like. The top molding extender is configurable to accommodate installations that involve differing wall depths and door heights In an alternate embodiment, the top hinge pin receiver is configured similar to the bottom hinge pin receiver using an upper hinge plate that extends from hinge-side molding 70 and which is spaced vertically from the hinge plate 100 positioned at the lower portion or distal end of the molding 70. In such an embodiment, the top hinge pin 200 will be engaged with a rotatably engageable element or aperture/bushing of the hinge plate rather than an aperture/bushing of the top molding 90. In another embodiment, one or more of the hinge plates and hinge pin receivers may be located at an intermediate position along the hinge side molding, with rotatably engageable hinge pins located at corresponding along the hinge-side edge of the secondary door. In yet another alternate embodiment, the top molding 90 comprises top hinge pin receivers or rotatably engageable elements on both left and right sides to accommodate left-opening and right opening door installations.

FIGS. 10 through 12*c* represent an alternate mechanism for attachment of the primary door molding to the primary door frame. In this embodiment, latch-side molding 80 comprises a latch-side mounting flange 250 which extends in a direction generally orthogonal to the plane of the closed position of the secondary door 20 and contacts an inner portion of latch-side jamb 50. Similarly, hinge-side molding 70 comprises a hinge-side mounting flange 260 which extends in a direction generally orthogonal to the plane of the closed position of the secondary door and contacts an inner portion of hinge-side jamb 40. In various embodiments, mounting flanges 250, 260 are attachable to jambs 40, 50 by any suitable mechanism, including mechanical fastening devices such as screws, rivets, nails, staples, dowels, customized mechanical connectors, and the like, and may additionally or alternatively use adhesives, welding, or combinations thereof. Latch-side molding 80 and latch-side mounting flange 250 may comprise a unitary construction, although they may be separate pieces joined together. Similarly, hinge-side molding 70 and hinge-side mounting flange 260 may comprise a unitary construction, although they may be separate pieces joined together. Other elements of FIGS. 10 through 12*c* can include similar features and functionality as described above with regard to FIGS. 1-9.

FIGS. 13 through 16 represent another feature that can be used for attachment of a primary door molding to a primary door frame. This embodiment utilizes mounting adapters such as a latch-side mounting adapter 270, which is illustrated in cross-section in FIG. 16. In particular, latch-side mounting adapter 270 includes attachment segment of a latch-side mounting adapter 271 which, when installed, extends in a direction generally orthogonal to the plane of the closed position of the secondary door and contacts an inner portion of latch-side jamb 40. Latch-side mounting adapter 270 includes a channel segment of latch-side mounting adapter 272 which, when installed, resides in a latch-side mounting adapter channel 290. After installation, a holding segment 273 of latch-side mounting adapter 270 maintains latch-side mounting adapter 270 in the latch-side mounting adapter channel 290 in a lateral direction. The preceding description applies similarly to a hinge-side mounting adapter 280 (which can have the same general configures as the latch-side mounting adapter 270) and a corresponding hinge-side mounting adapter channel 300.

Latch-side and hinge-side mounting adapters 270, 280 may be identical if turned end-to-end, as they are in the depicted embodiment, which can be useful for design and manufacturing considerations. Mounting adapters 270, 280 are attached to jambs 40, 50 by any suitable mechanism, including mechanical fastening devices such as screws, rivets, nails, staples, dowels, customized mechanical connectors, and the like, and may additionally or alternatively use adhesives, welding, or combinations thereof. Mounting of the primary door molding on the primary door frame by the mechanism of mounting adapters 270, 280 traveling in mounting adapter channels 290, 300 permits a limited amount of vertical and lateral movement of the primary door molding relative to the primary door frame. Optionally, after installation of primary/secondary door system 10 and adjustment of the position of the primary door molding, elements of the primary door molding may be affixed directly to elements of the primary door frame by any of the attachment mechanisms described above to prevent further movement of the primary door molding. Other elements of FIGS. 13 through 15*c* can include similar features and functionality as described above with regard to FIGS. 1-9.

A primary/secondary door system according to an embodiment of the present disclosure includes the primary door frame (which includes hinge- and latch-side jambs, head, and sill) and the primary door molding (which includes hinge- and latch-side molding and top molding) assembled together. Optionally, these components form an integral construction. The primary/secondary door system additionally includes a primary door rotatably attached by hinges to the primary door frame. The primary/secondary door system (minus secondary door) can be installed (e.g., in a door opening in a commercial or residential building) in the customary manner for a primary door. Optionally, the primary door molding is anchored or attached to the building surface. The primary/secondary door system is then ready for mounting of the secondary door on the primary door molding.

The present invention has now been described with reference to several embodiments thereof. The foregoing detailed description and examples have been given for clarity of understanding only. No unnecessary limitations are to be understood therefrom. It will be apparent to those skilled in the art that many changes can be made in the embodiments described without departing from the scope of the invention. The implementations described above and other implementations are within the scope of the following claims.

What is claimed is:

1. A door system comprising:

a door molding attachable to a door frame, the door molding comprising:

a horizontal member; and a first vertical member extending downwardly from the horizontal member and including a first hinge member;

wherein one of the horizontal member from and the first vertical member comprises a first rotatably engageable element, and wherein the first hinge member comprises a second rotatably engageable element vertically spaced from the first rotatably engageable element; and a door panel rotatably engageable with the first and second rotatably engageable elements, the door panel comprising a third rotatably engageable element engageable with the first rotatably engageable element and a fourth rotatably engageable element engageable with the second rotatably engageable element;

wherein the first rotatably engageable element comprises a first pin-receiving portion and the third rotatably engageable element comprises a first pin rotatably engageable with the first pin-receiving portion, and the second rotatably engageable element comprises a second pin-receiving portion and the fourth rotatably engageable element comprises a second pin rotatably engageable with the second pin-receiving portion; and wherein at least one of the first pin and the second pin is spring loaded so as to be retractable and extendable.

2. The door system of claim 1, wherein the horizontal member comprises the first rotatably engageable element.

3. The door system of claim 1, further comprises a top molding extender that is adjustably engageable with respect to the horizontal member to achieve a desired vertical positioning of the top molding extender.

4. The door system of claim 1, wherein the first hinge member extends from a distal end of the first vertical member that is spaced from the horizontal member.

5. The door system of claim 1, wherein the first vertical member further comprises a second hinge member vertically spaced from the first hinge member, wherein the second hinge member comprises the first rotatably engageable element.

6. The door system of claim 1, where at least one of the first pin and the second pin comprises a tapered end portion.

7. The door system of claim 1, wherein at least one of the first and second rotatably engageable elements comprises an aperture.

8. The door system of claim 7, wherein at least one of the first and second rotatably engageable elements comprises a bushing.

9. The door system of claim 8, wherein the bushing of at least one of the first and second rotatably engageable elements comprises a tapered pin- receiving portion.

10. The door system of claim 1, wherein the door molding comprises a second vertical member extending downwardly from the horizontal member and spaced from the first vertical member.

11. The door system of claim 10, wherein the second vertical member comprises a door latch channel configured to receive a door latch bolt.

12. The door system of claim 10, wherein at least one of the first vertical member and the second vertical member further comprises a mounting adapter channel, and wherein the door system further comprises at least one mounting adapter that comprises at least one of:

an attachment segment attachable to a vertical portion of a door frame;

an intermediate segment extending at an angle from the first attachment segment; and a holding segment extending from the intermediate segment and positionable in the one of the mounting adapter channels.

13. A door system comprising:

a door molding attachable to a door frame, the door molding comprising:

a horizontal member;

a first vertical member extending downwardly from the horizontal member and including a first hinge member; and a second vertical member extending downwardly from the horizontal member and spaced from the first vertical member;

wherein one of the horizontal member and the first vertical member comprises a first rotatably engageable element, and wherein the first hinge member comprises a second rotatably engageable element vertically spaced from the first rotatably engageable element; and wherein each of the first and second vertical members comprises a mounting adapter channel and wherein the door system further comprises first and second mounting adapters with holding segments positionable in the mounting adapter channels of the first and second vertical members.

14. The door system of claim 13, wherein the door molding is connectable to the door frame by the first and second mounting adapters such that the position of the door molding relative to the door frame is adjustable.

15. The door system of claim 13, further comprising a door panel rotatably engageable with the first and second rotatably engageable elements.

16. The door system of claim 15, wherein the door panel comprises at least one of a third rotatably engageable element engageable with the first rotatably engageable element and a fourth rotatably engageable element engageable with the second rotatably engageable element.

17. The door system of claim 16, wherein:

one of the first and third rotatably engageable elements comprises a first pin-receiving portion and the other of the first and third rotatably engageable elements comprises a first pin rotatably engageable with the first pin-receiving portion; and one of the second and fourth rotatably engageable elements comprises a second pin-receiving portion and the other of the second and fourth rotatably engageable elements comprises a second pin rotatably engageable with the second pin-receiving portion.

18. The door system of claim 17, wherein at least one of the first pin and the second pin is retractable and extendable.

19. A door system comprising:

a door molding attachable to a door frame, the door molding comprising:

a horizontal member;

a first vertical member extending downwardly from the horizontal member and including a first hinge; and a second vertical member extending downwardly from the horizontal member and spaced from the first vertical member;

wherein one of the horizontal member and the first vertical member comprises a first rotatably engageable element, and wherein the first hinge member comprises a second rotatably engageable element vertically spaced from the first rotatably engageable element a door panel rotatably engageable with the first and second rotatably engageable elements; and a door closer mechanism attached to the horizontal member and the door panel, the door closer mechanism including a door closer concealed in one of the horizontal member and a top portion of the door, and a door closer arm having a first end connected to the door closer and a second end connected to the other of the horizontal member and the top portion of the door panel.

20. The door system of claim 19, wherein the closer arm comprises at least a first arm segment hingedly attached to a second arm segment.

* * * * *